United States Patent
Tachinami

(10) Patent No.: US 12,299,721 B2
(45) Date of Patent: May 13, 2025

(54) INFORMATION PROCESSING APPARATUS, INFORMATION PROCESSING METHOD, PROGRAM, AND COMPUTER-READABLE RECORDING MEDIUM

(71) Applicant: SATO HOLDINGS KABUSHIKI KAISHA, Tokyo (JP)

(72) Inventor: Hideki Tachinami, Tokyo (JP)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 168 days.

(21) Appl. No.: 17/780,628

(22) PCT Filed: Nov. 9, 2020

(86) PCT No.: PCT/JP2020/041691
§ 371 (c)(1),
(2) Date: May 27, 2022

(87) PCT Pub. No.: WO2021/106531
PCT Pub. Date: Jun. 3, 2021

(65) Prior Publication Data
US 2023/0360095 A1 Nov. 9, 2023

(30) Foreign Application Priority Data
Nov. 29, 2019 (JP) ................. 2019-217535

(51) Int. Cl.
*G06Q 30/00* (2023.01)
*G06Q 30/06* (2023.01)
*H04W 4/02* (2018.01)

(52) U.S. Cl.
CPC ............ *G06Q 30/06* (2013.01); *H04W 4/02* (2013.01)

(58) Field of Classification Search
CPC ............................................. G06Q 30/06–08
See application file for complete search history.

(56) References Cited

U.S. PATENT DOCUMENTS

| 2017/0330206 A1 | 11/2017 | Yada et al. |
| 2019/0188734 A1 | 6/2019 | Nagai |

(Continued)

FOREIGN PATENT DOCUMENTS

| JP | 2000-357177 A | 12/2000 |
| JP | 2016-177583 A | 10/2016 |

(Continued)

OTHER PUBLICATIONS

"Kankan AI Retail System Delivers Strong Initial Results for CPI Lotus Supermarket: Kankan Expected to Expand to More Supermarkets in the Months Ahead", PR Newswire, Dec. 10, 2018 (Year: 2018).*

(Continued)

*Primary Examiner* — Ethan D Civan
(74) *Attorney, Agent, or Firm* — Foley & Lardner LLP

(57) ABSTRACT

The present invention is an information processing apparatus configured to associate flow line information of a purchaser and product sales information, a region in an area where products are placed being set per category of products, the information processing apparatus including: a first acquisition unit configured to acquire the flow line information of the purchaser from a communication device that moves together with the corresponding purchaser in the area, the flow line information of the purchaser containing position information showing positions in the area of the communication device with the lapse of time; a second acquisition unit configured to acquire the product sales information that contains sales times of products and categories of the products purchased at the sales times; a product category identification unit configured to identify the categories of the products that are associated with the flow line information of the purchaser, from the flow line information of the purchaser acquired by the first acquisition unit and from the category information of the products placed in the area; a third acquisition unit configured to acquire a degree of association of the flow line information of the purchaser with the product sales information, based on the categories of the products contained in the product sales information acquired by the second acquisition unit and (Continued)

based on the categories of the products identified by the product category identification unit; and an association unit configured to associate the flow line information of the purchaser with the product sales information based on the degree of association acquired by the third acquisition unit.

15 Claims, 23 Drawing Sheets

(56) References Cited

U.S. PATENT DOCUMENTS

2019/0213616 A1* 7/2019 Eppley ................ H04W 4/029
2019/0213661 A1* 7/2019 Brightwell ......... G06Q 30/0218

FOREIGN PATENT DOCUMENTS

JP      2017-033442 A      2/2017
JP      2019-109751 A      7/2019

OTHER PUBLICATIONS

Extended European Search Report issued in connection with EP Appl. Ser. No. 20894224.3 dated Dec. 21, 2022.

* cited by examiner

| PRODUCT CATEGORY | | SELL ZONE | PERFECTLY MATCH FLAG |
|---|---|---|---|
| C1 | ALCOHOLIC BEVERAGES | Z6, Z15 | True |
| C2 | PREPARED FOODS | Z11, Z12, Z20 | False |
| C3 | MEAT | Z1 | False |
| ⋮ | ⋮ | ⋮ | ⋮ |

PRODUCT PLACEMENT TABLE

FIG.3

| POS DATA | SALES TIME | PRODUCT CATEGORY | CHECKOUT COUNTER NUMBER |
|---|---|---|---|
| P-1 | 2019.9.27 8:54:12 | C2, C5, C8 | R2 |
| P-2 | 2019.9.27 8:55:02 | C1, C5 | R1 |
| ⋮ | ⋮ | ⋮ | ⋮ |
| ⋮ | ⋮ | ⋮ | ⋮ |
| P-N | 2019.9.27 13:18:10 | C3, C7, C9, C10 | R3 |

POS DATABASE

FIG.4

| TIME | | POSITION | ZONE |
|---|---|---|---|
| t0 | 2019.9.27 10:35:00 | ( 306.1 , 1028.9 ) | Z14 |
| t1 | 2019.9.27 10:35:02 | ( 306.2 , 1027.8 ) | Z14 |
| t2 | 2019.9.27 10:35:04 | ( 306.1 , 1027.5 ) | Z14 |
| ⋮ | ⋮ | ⋮ | |
| t1000 | 2019.9.27 11:08:20 | ( 2425.5 , 85.1 ) | RZ |

FLOW LINE DATA

FIG.5

| TAG ID | FLOW LINE DATA | CHECKOUT COUNTER ENTERING TIME | CHECKOUT COUNTER NUMBER |
|---|---|---|---|
| 1 | FL(1) | 2019.9.27 12:08:10 | R3 |
| 2 | FL(2) | 2019.9.27 11:15:37 | R2 |
| ⋮ | ⋮ | ⋮ | ⋮ |
| i | FL(i) | TE(i) | R(i) |
| ⋮ | ⋮ | ⋮ | ⋮ |
| N | FL(N) | 2019.9.27 9:10:46 | R1 |

PURCHASER DATA SET

FIG.13

| POS RANGE DATA PR(i) | PRE-SCORING PROCESSED DATA |
|---|---|
| P(i, 1) | Sp(i, 1) |
| P(i, 2) | Sp(i, 2) |
| ⋮ | ⋮ |
| P(i, j) | Sp(i, j) |
| ⋮ | ⋮ |
| P(i, M$_i$) | Sp(i, M$_i$) |

PRE-SCORING PROCESSED DATA OF TAG ID "i"

FIG.18

| TAG ID | POS DATA |
|--------|----------|
| 1 | P-3 |
| 2 | P-12 |
| ⋮ | ⋮ |
| N | P-xx |

MATCHED DATA SET

FIG.23

INFORMATION PROCESSING APPARATUS, INFORMATION PROCESSING METHOD, PROGRAM, AND COMPUTER-READABLE RECORDING MEDIUM

FIELD

The present invention relates to an information processing apparatus, an information processing method, a program, and a computer-readable recording medium.

BACKGROUND

In order to understand user consumption behavior and to raise more sales in commercial facilities, such as supermarkets and shopping malls, analyzing information about how consumers move around has been developed.

In one example, a position information collector has been developed (for example, Japanese Unexamined Patent Application Laid-Open No. 2017-33442). The position information collector accumulates behavior logs (movement histories) of customer users in shopping floors by receiving signals transmitted from signal transmitters. The signal transmitters are disposed on portable containers for containing products and can be carried by users in shopping areas.

BRIEF SUMMARY

Technical Problem

In these circumstances, the techniques of collecting and analyzing information about how consumers move around in stores have been developed heretofore; however, analyzing has not been performed on how purchasers move around in a store to actually purchase certain products. On the condition that purchaser behavior in a store is associated with an actual purchase result, it is possible to analyze what product the purchaser behavior in the store led to buy or which product was not bought in spite of the purchaser behavior in the store.

In view of this, an object of the present invention is to associate the behavior in a store of a purchaser with an actual purchase result of the purchaser.

Solution to Problem

One aspect of the present invention provides an information processing apparatus configured to associate flow line information of a purchaser and product sales information. Each of a plurality of regions in an area is set per category of products. The information processing apparatus includes a first acquisition unit, a second acquisition unit, a product category identification unit, a third acquisition unit, and an association unit. The first acquisition unit is configured to acquire the flow line information of the purchaser from a communication device that moves together with the corresponding purchaser in the area. The flow line information of the purchaser contains position information showing positions in the area of the communication device with the lapse of time. The second acquisition unit is configured to acquire the product sales information that contains sales times of products and categories of the products purchased at the sales times. The product category identification unit is configured to identify the categories of the products that are associated with the flow line information of the purchaser, from the flow line information of the purchaser acquired by the first acquisition unit and from the category information of the products placed in the area. The third acquisition unit is configured to acquire a degree of association of the flow line information of the purchaser with the product sales information, based on the categories of the products contained in the product sales information acquired by the second acquisition unit and based on the categories of the products identified by the product category identification unit. The association unit is configured to associate the flow line information of the purchaser with the product sales information based on the degree of association acquired by the third acquisition unit.

Advantageous Effects

The one aspect of the present invention enables associating behavior in a store of a purchaser with an actual purchase result of the purchaser.

BRIEF DESCRIPTION OF DRAWINGS

FIG. 3 shows an example of data components of a product placement table.

FIG. 4 shows an example of data components of a POS database.

FIG. 5 shows an example of data components of flow line data.

FIG. 13 shows an example of data components of a purchaser data set.

FIG. 18 shows association between each POS data of POS range data and pre-scoring processed data of a purchaser of a certain tag ID.

FIG. 23 shows an example of data components of a matched data set.

DETAILED DESCRIPTION

The present invention is related to Japanese Patent Application No. 2019-217535 filed with the Japan Patent Office on Nov. 29, 2019, the entire contents of which are incorporated into this specification by reference.

Hereinafter, an embodiment of an information processing apparatus and a program of the present invention will be described. The following describes an example of a system including an information processing apparatus, which is a purchase analysis system for analyzing a purchaser by associating flow line information of the purchaser with product sales information.

For example, in a store with a plurality of selling sections existing alongside one another, such as a supermarket, many store visitors move around in the store to pick up products from the selling sections and then pay at a checkout counter (at a payment machine). The result of paying at the checkout counter (that is, POS data showing details of purchased products) is accumulated in a POS system. Meanwhile, data (flow line data) showing a flow line in the store of the purchaser is obtained by another system different from the POS system. For this reason, in order to analyze what product the purchaser behavior in the store led to buy or which product was not bought in spite of the purchaser behavior in the store, it is necessary to associate the POS data with the flow line data with respect to each purchaser.

In consideration of this, a purchase analysis system 1 described below is configured to associate details of purchase made in a store by a purchaser, with the behavior in the store of the purchaser.

The purchase analysis system 1 tracks a position of a communication device that moves together with a purchaser, in order to obtain flow line data of the purchaser. The following describes a case in which a communication device that moves together with a purchaser is a radio tag attached to a shopping cart. However, the kind of the communication device is not limited thereto, and any communication device that is movable together with a user can be used. The communication device may be a mobile terminal such as a smartphone, a tablet terminal, or a wearable terminal, of a purchaser. In addition, any object that moves together with a purchaser can be used as an object to which a communication device (radio tag or the like) is attached, and a shopping cart is not necessarily used. For example, the communication device (radio tag or the like) may be attached to a shopping basket. Even though the communication device is attached to a shopping cart or a shopping basket, the position of the communication device (radio tag or the like) can be considered to be substantially the same as the position of a purchaser (or store visitor) who moves together with the shopping cart or the shopping basket.

(1) Overview of Purchase Analysis System

An overview of a purchase analysis system 1 of this embodiment will be described with reference to FIGS. 1 to 4.

Figure 1:
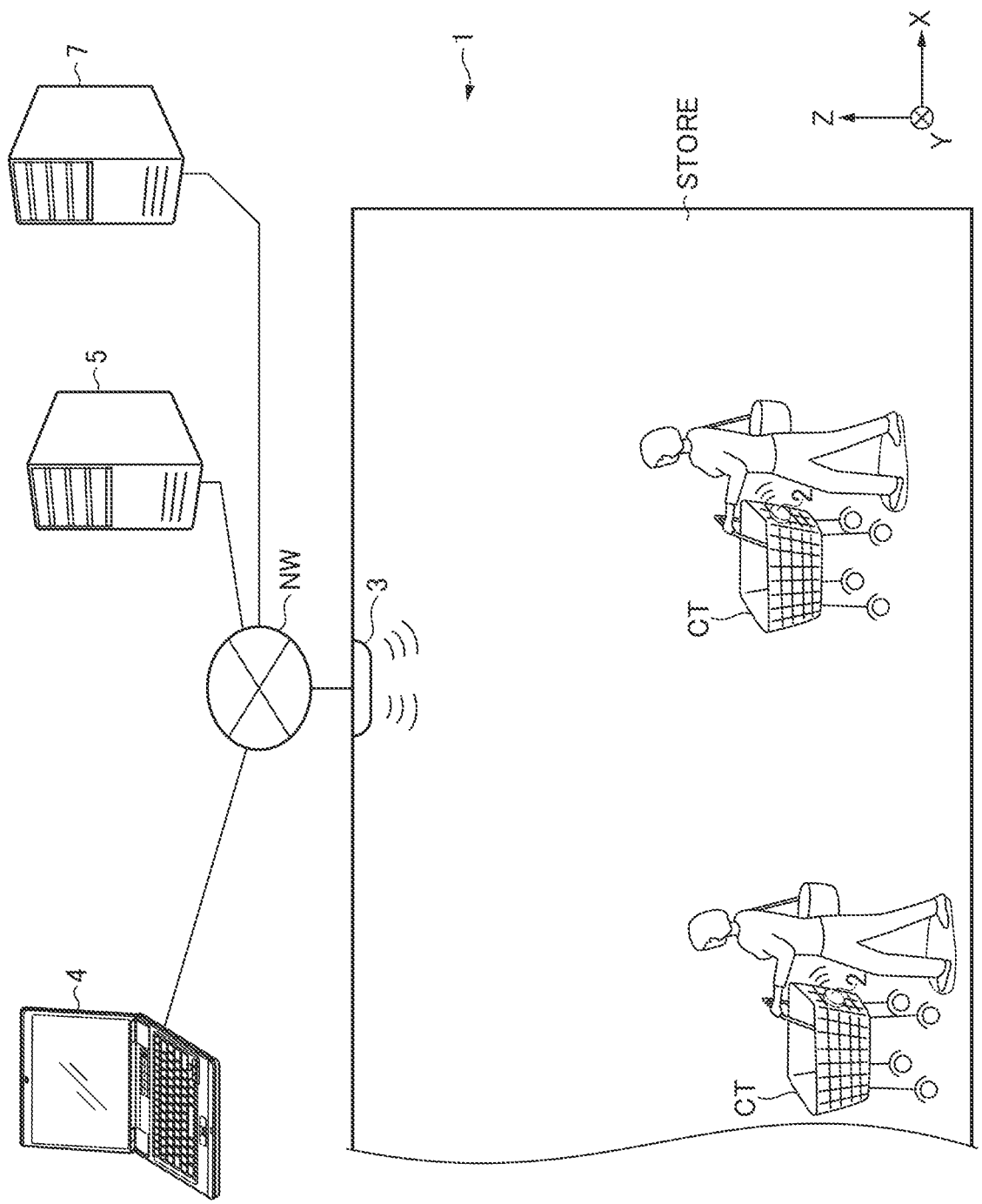
FIG. 1 schematically shows a purchase analysis system of an embodiment.
Figure 2:
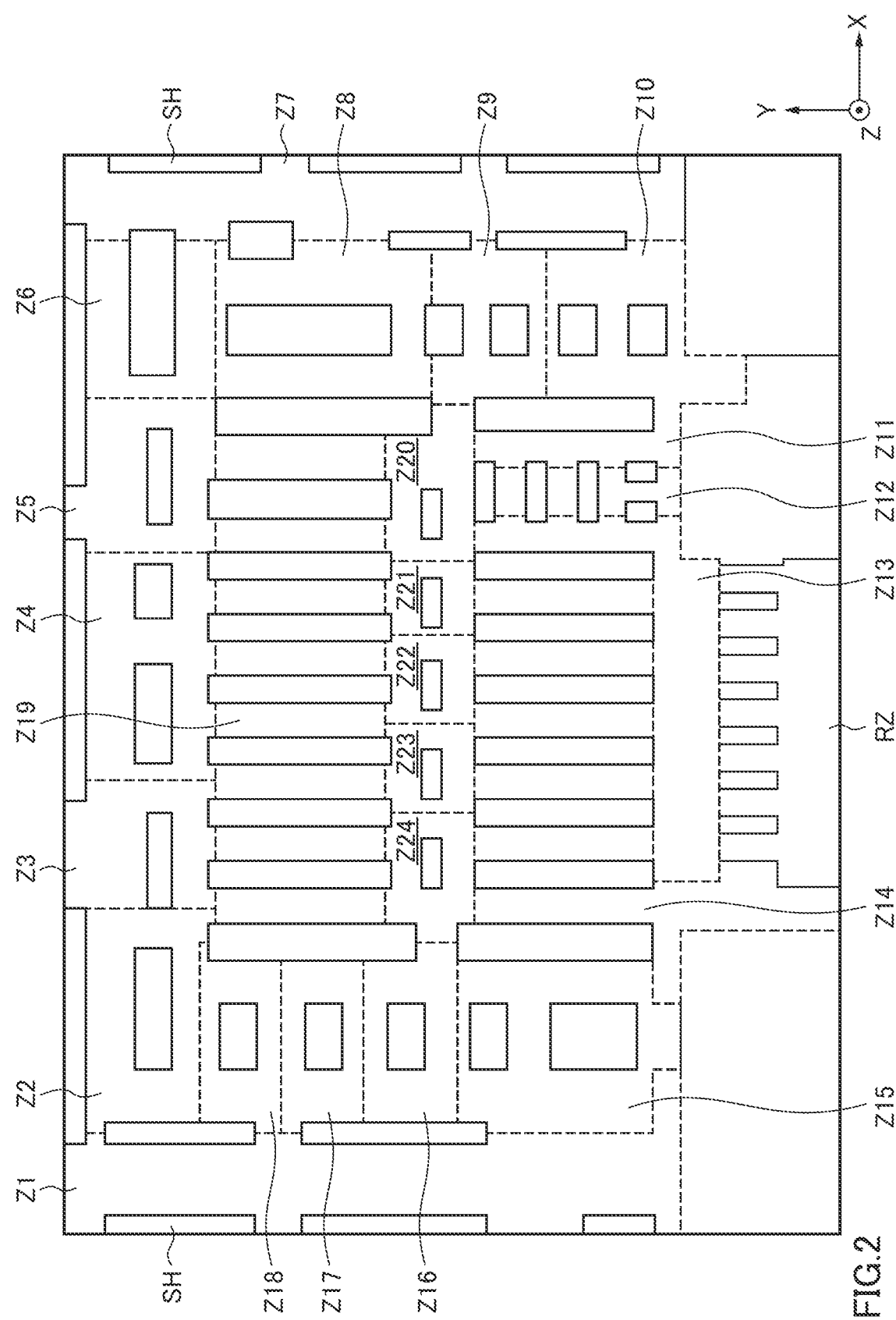
FIG. 2 is a plan view of an exemplary store employing the purchase analysis system of the embodiment.

FIG. 1 schematically shows the purchase analysis system 1 of this embodiment. FIG. 2 is a plan view of an exemplary store employing the purchase analysis system 1 of this embodiment. Note that an XYZ coordinate system is defined for the purpose of showing directions in each drawing. FIG. 3 shows an example of data components of a product placement table. FIG. 4 shows an example of data components of a POS database.

As shown in FIG. 1, the purchase analysis system 1 of this embodiment includes a radio tag 2, a receiver 3, a store terminal 4, a server 5 (an example of an information processing apparatus), and a POS system 7. The radio tag 2 is attached to a cart CT that is used in a store by each purchaser. Although FIG. 1 shows a case of attaching the radio tag 2 to the cart CT, the radio tag 2 may be attached to a shopping basket (not shown) on the cart CT.

As described above, the radio tag 2 is an example of a communication device and is a relatively small wireless communication device.

The receiver 3 and the server 5 are connected via a network NW and constitute a position identification system for identifying a position in a store of a store visitor. The network NW is, for example, a cellular network, a Wi-Fi network, the Internet, a local area network (LAN), a wide area network (WAN), a public circuit, a dedicated circuit, or a wireless base station. The receiver 3 (locator) is installed on a ceiling of the store. The receiver 3 receives a radio wave that is transmitted by the radio tag 2, which is attached to a cart CT used in the store by a store visitor, and it measures an incident angle of the radio wave. The server 5 identifies a position (position in terms of XY coordinates) in the store of the purchaser from the incident angle measured by the receiver 3 (that is, measures the position of the radio tag 2).

The communication protocol between the radio tag 2 and the receiver 3 is not specifically limited, but examples thereof include Wi-Fi (registered trademark) and Bluetooth Low Energy (registered trademark) (hereinafter abbreviated as "BLE").

The server 5 measures a position of a store visitor (that is, a position of the radio tag 2) to create (acquire) flow line data and acquires a POS database from the POS system 7.

A matching program is installed in the server 5. The matching program executes a process for associating each tag ID with one of POS data contained in the POS database, based on flow line data of each tag ID (that is, device identification information) for identifying each radio tag 2 (hereinafter called "matching" or a "matching process" as appropriate). Associating each tag ID with one of POS data contained in the POS database is equivalent to associating each purchaser with POS data.

The store terminal 4 is placed, for example, in an office of the store, and it is a terminal having a display panel, such as a personal computer or a tablet terminal. The store terminal 4 is communicable with the server 5 via the network NW. For example, the store terminal 4 acquires and displays flow line data per tag ID or displays flow line data per tag ID and POS data of a purchaser corresponding to the tag ID in an associated manner, as a result of executing the matching program. This enables an employee of the store to analyze purchaser behavior in the store.

Although this embodiment uses the store terminal 4 for the purpose of viewing the result of executing the matching program by the server 5, etc., such a terminal does not have to be installed in the store. In one example, the system may be configured so that the execution result and so on can be viewed from any information processing terminal that is accessible to the server 5 by authentication of log-in information.

With reference to FIG. 2, the area in the exemplary store includes a plurality of sell zones (simply called "zones" as appropriate) Z1 to Z24 and a checkout zone RZ, and product shelves SH for arranging products are equipped to each store. Each of the zones is assigned in accordance with categories of sales products, for example, such that they are assigned to be a meat zone, a prepared food zone, and a confectionery zone. Each of the zones is an example of a region in the area, and the checkout zone RZ is an example of a product payment region.

Products in the store are placed in accordance with the product placement table, which is illustrated in FIG. 3. This product placement table is stored in the server 5 and can be updated in response to a request from the store terminal 4, as appropriate.

As shown in FIG. 3, a sell zone in which products belonging to the corresponding product category are placed, is assigned (set) to each product category, in the product placement table. In one example, the sell zones Z6 and Z15 are assigned to alcoholic beverages of a product category C1. Herein, products belonging to a certain product category may not be placed in all of sell zones of the certain product category, and they are placed in one or more of the sell zones. In one example, the product placement table in FIG. 3 shows that products belonging to alcoholic beverages of the product category C1, such as wine, Japanese sake, etc., are placed in at least one of the sell zones Z6 and Z15. In an actual case, the sell zone in which products such as wine, Japanese sake, etc., are placed, is determined by a person in charge in the store.

In FIG. 3, the perfectly match flag is "True" (an example of first setting) in the case in which there is no possibility of changing the sell zone of the products belonging to the corresponding product category (that is, the selling position is fixed); in contrast, it is "False" (an example of second setting) in the case in which there is a possibility of changing the sell zone. In one example, the perfectly match flag of alcoholic beverages of the product category C1 is "True", which means that the sell zone in which they are placed is normally at least one of the sell zones Z6 and Z15. In contrast, the sell zone in which products of the product category having the perfectly match flag "False" can be changed depending on convenience of the store. In one example, prepared foods of the product category C2 are normally placed in at least one of the sell zones Z11, Z12, and Z20. However, a new sell zone can be added, or one or more of the currently set sell zones (Z11, Z12, and Z20) can be deleted, for example, depending on seasons or special sales.

The fineness of classification of products according to the product category can be set as appropriate. Increasing the fineness of classification of product categories (for example, instead of setting a zone for alcoholic beverages, a zone is set for each of wine and Japanese sake of smaller categories) enhances matching accuracy. On the other hand, the place of products of a small product category can be changed frequently due to convenience of the store, and the product placement table should be updated each time.

The POS system 7 is provided so as to communicate with the server 5 via the network NW. The POS system 7 creates POS data (an example of sales information) of one purchase of a purchaser as sales information of the store and accumulates it in the POS database. The server 5 acquires the POS database from the POS system 7.

As illustrated in FIG. 4, the purchase analysis system 1 of this embodiment assumes that the POS database contains N pieces (N is an integer of 2 or larger) of POS data, which are POS data P-1, P-2, . . . , and P-N. The POS database includes a value of each of fields "SALES TIME", "PRODUCT CATEGORY", and "CHECKOUT COUNTER NUMBER", with respect to the record of one POS data. The value of the field "CHECKOUT COUNTER NUMBER" is a checkout counter number (one of checkout counter numbers R1 to R6 in the example of this embodiment; an example of payment machine information) for identifying a checkout counter at which a purchaser made a payment. In the POS database, the POS data P-1, P-2, . . . , and P-N are arrayed in the order of sales time.

(2) Positioning Method of Purchaser

Next, a method of positioning a purchaser will be described with reference to FIGS. 5 and 6.

FIG. 5 shows an example of data components of flow line data. FIG. 6 shows an example of a flow line of one radio tag 2 in the plan view of FIG. 2. In this embodiment, the flow line of the radio tag 2 is considered to be equivalent to the flow line of a corresponding purchaser.

The radio tag 2 is positioned as described above. Specifically, the receiver 3, which is installed on a ceiling of the store, receives a radio wave (beacon signal) that is transmitted from the radio tag 2 attached to a cart being used by a purchaser. The receiver 3 uses an angle-of-arrival (AOA) method for calculating an incident angle of the received beacon signal. The receiver 3 measures an incident angle (arrival direction) of the beacon signal, which is received from the radio tag 2, and it transmits information of the measured incident angle to the server 5. The server 5 estimates the position (XY coordinates) of the radio tag 2 from the position (position in terms of XYZ coordinates) in the store of the source receiver 3 and from the incident angle relative to this position.

The position of the radio tag 2 can be estimated only by one receiver 3 (locator). However, it is preferable to install more receivers 3 in accordance with the degree of a received signal strength indicator (RSSI) of a beacon signal, a store floor area, and a radio wave environment in the store. In one example, the receivers 3 are arranged on a ceiling of the store at equal intervals. The receivers 3 are preferably arranged at shorter intervals particularly at a place that requires high positioning accuracy, such as a place densely having selling sections.

The method of positioning the radio tag 2 is not limited to the AOA method, and another method, such as a time-of-arrival (TOA) method, may be used.

Although being able to be freely set, the positioning interval of the radio tag 2 is set to a time necessary to correctly understand purchaser behavior (for example, 100 milliseconds to 2 seconds).

The server 5 calculates the position of the radio tag 2 and records flow line data of each radio tag 2.

The flow line data shown in FIG. 5 contains data (an example of position information) of the position (XY coordinates) of the radio tag 2 at each positioning time. In this example, the time t0 represents the time of entering the store, whereas the time t1000 represents the time of leaving the store after passing through the checkout zone RZ. This flow line data that is plotted in the plan view of the store in FIG. 2 is illustrated in FIG. 6 as a flow line FL of a radio tag 2.

The zone in the flow line data shown in FIG. 5 represents a sell zone of a position that was measured.

(3) Measurement Method of Stay Time

Next, a method of measuring a stay time in the store of a purchaser will be described with reference to FIGS. 7 to 9.

The stay time is time during which a purchaser stands still in the midst of moving around in the store and is a factor for enhancing matching accuracy. As shown in FIG. 6, the flow line FL of the radio tag 2 includes only path information of purchaser behavior in the store. Thus, considering the information of the stay time in a matching process improves matching accuracy, as described later.

Figure 7:
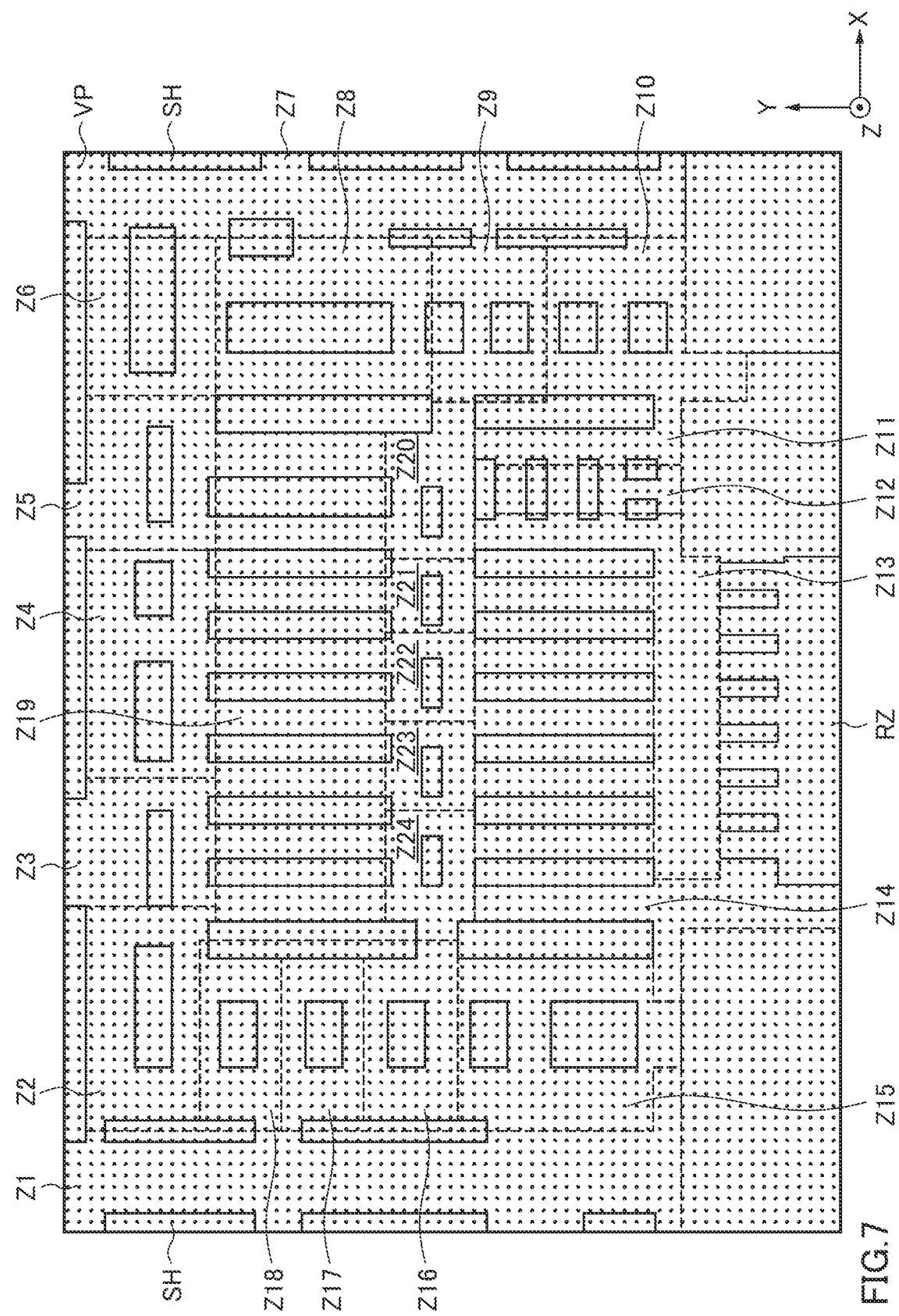
FIG. 7 shows an example of arrangement of virtual points in the plan view of FIG. 2.
Figure 8:
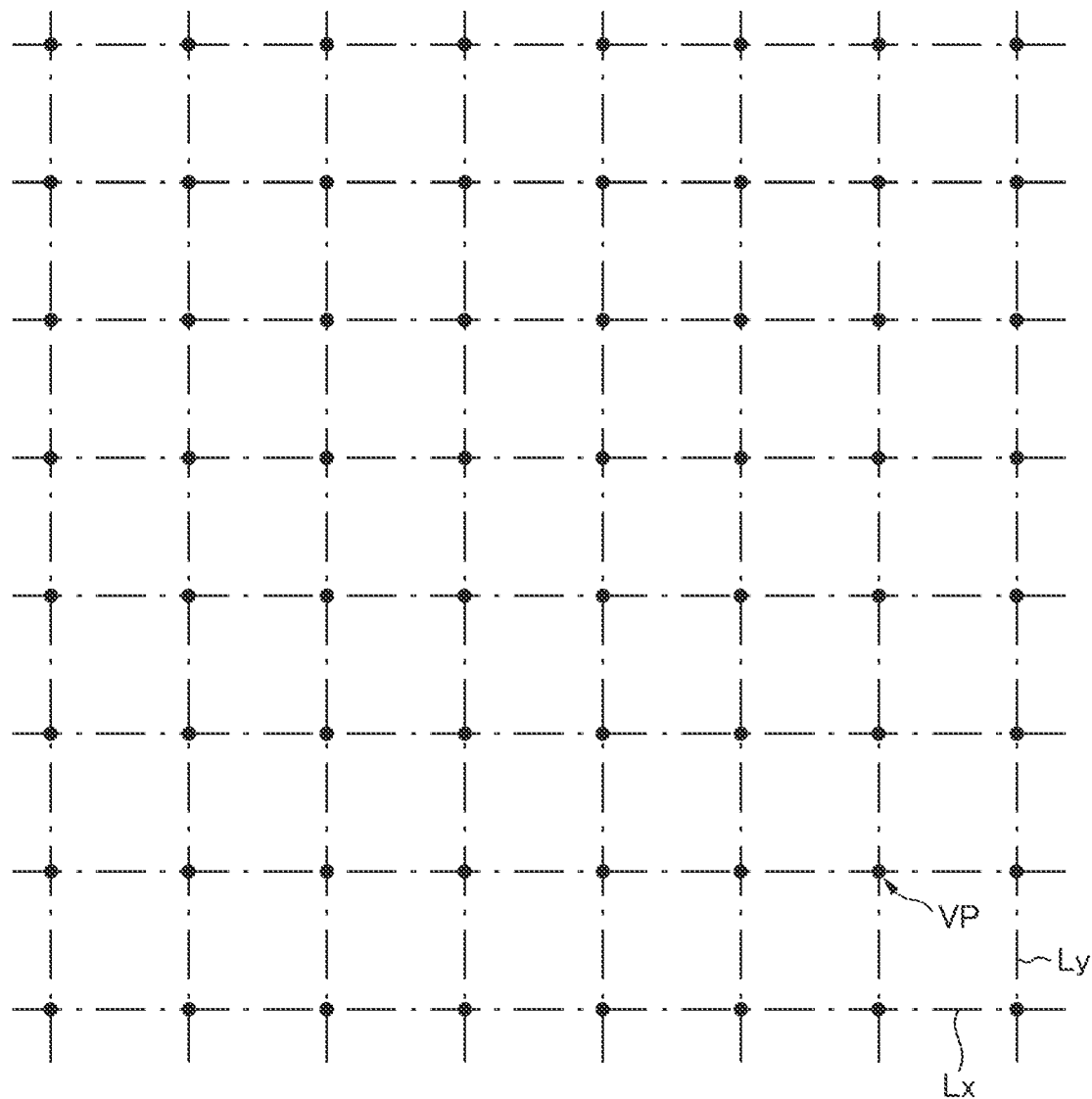
FIG. 8 shows an example of setting virtual points.

As shown in FIG. 7, in order to measure the stay time in the store of a purchaser, the purchase analysis system 1 of this embodiment uses virtual points VP that are set in the area including the sell zones Z1 to Z24 in the store. That is, as shown in FIG. 8 that illustrates a partially enlarged view of the area in FIG. 7, virtual points VP are defined as points of intersection between virtual lines Lx and Ly that are arranged in grid along an X-axis and a Y-axis in the area of the sell zones in the store. The stay time of a purchaser is measured per this virtual point VP.

The distance between two adjacent virtual points VP is freely set, but it is preferably set in accordance with positioning accuracy of the position identification system, which is composed of the receiver 3 and the server 5. In one example, in the condition that the positioning accuracy of the position identification system is 50 centimeters, the distance between two adjacent virtual points VP may be set to 50 centimeters.

A specific method of measuring the stay time will be described with reference to FIG. 9.

Figure 9:
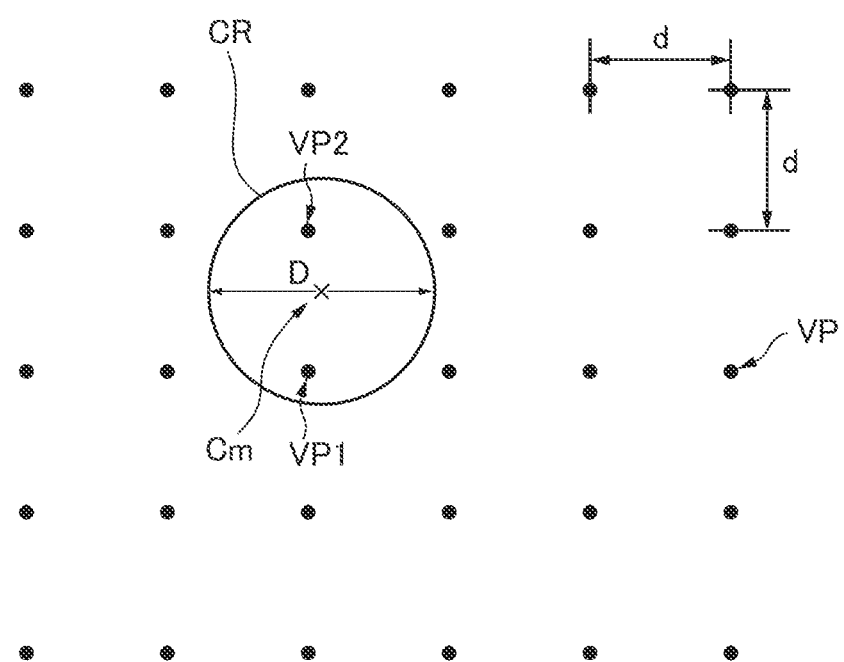
FIG. 9 shows an example of a virtual circle set in an exemplary store.

In FIG. 9, it is assumed that the radio tag 2 is at a position Cm. In this state, a virtual circle CR with a predetermined diameter "D" centering at the position Cm is set, and virtual points within the circular region of this virtual circle CR (virtual points VP1 and VP2 in the example in FIG. 9) are identified. Then, the time during which, for example, the virtual points VP1 and VP2 continuously exist in the circular region of the virtual circle CR due to a purchaser staying at the same position, is measured as a stay time. Although FIG. 9 illustrates a circular predetermined range, the shape of the predetermined range is not limited to the circular shape. The shape may be an elliptical shape (including a substantially elliptical shape with a straight part), a square shape, or a rectangular shape.

The virtual circle CR moves together with the radio tag 2 that moves in accordance with a purchaser moving around in the store, and the virtual point VP that is contained in the circular region of the virtual circle CR set for the radio tag 2 is changed. The duration during which a virtual point VP set in the store area is contained in the virtual circle CR corresponding to a purchaser is used as the stay time. That is, the stay time at each virtual point VP is measured with respect to one purchaser (in other words, with respect to one radio tag 2).

Herein, the stay time at each virtual point VP may be measured in terms of integrated value (integrated time) or maximum value (maximum duration). The following describes a "stay time (integrated value)" for the stay time calculated in terms of integrated value and describes a "stay time (maximum value)" for the stay time calculated in terms of maximum value, with respect to one virtual point. When matters that are common between the stay time (integrated value) and the stay time (maximum value) are referred to, these stay times are simply described as "stay time". The stay time is an example of a measurement time.

The stay time (integrated value) is a value calculated by integrating time that is measured at each virtual point VP, without resetting, from the time a purchaser enters the store until the purchaser leaves the store.

The stay time (maximum value) is a maximum value of duration during which a virtual point VP exists in the circular region of the virtual circle CR, from the time a purchaser enters the store until the purchaser leaves the store. The duration during which a virtual point VP exists in the circular region of the virtual circle CR is measured each time, and the duration is reset at the time the virtual point VP once goes out of the circular region of the virtual circle CR.

The size of the virtual circle CR that is set so as to center at the position of the radio tag 2 is preferably determined based on a reference distance "d" (refer to FIG. 9) being a distance between two adjacent virtual points VP. Specifically, the diameter "D" of the virtual circle CR is set larger than the reference distance "d" being a distance between two adjacent virtual points. The reason of this is as follows.

That is, if no virtual point VP exists in the circular region of the virtual circle CR, the stay time cannot be measured. If only one virtual point VP is contained in the circular region of the virtual circle CR, although a purchaser actually stops in a certain zone, the stay time can be measured by assuming that the purchaser stays in another zone adjacent to the certain zone due to positioning error of the radio tag 2. On the other hand, in this embodiment, at least two virtual points VP are usually contained in the circular region of the virtual circle CR, whereby the stay time is measured at each virtual point VP. This avoids mistakenly measuring the stay time at a boundary between the sell zones.

As to a diameter "D" of the virtual circle CR being excessively greater than the reference distance "d", the stay time is measured at a virtual point VP that is separated from the position where a purchaser actually stays and deviates from the actual situation. As a result, the error in the stay time at each virtual point VP in the area is increased.

In view of this, the diameter "D" of the virtual circle CR is preferably set so as to contain two to five virtual points VP in the circular region of the virtual circle CR. In one example, the diameter "D" of the virtual circle CR is preferably set so as to satisfy the relationship "d<D≤2d".

The sum of the stay times of respective virtual points (total stay time) is calculated per sell zone, from the stay time at each virtual point VP. This provides information about in which sell zone and how long a purchaser stood still in the midst of moving around in the store (i.e., information of stay times per sell zone).

In other words, the total stay time in a certain cell zone is the sum of the stay times that are calculated with respect to the respective plurality of virtual points contained in the certain sell zone, from the time a purchaser enters the store until the purchaser leaves the store. In this case, in accordance with whether the stay time (integrated value) is calculated or the stay time (maximum value) is calculated at each virtual point, one of a total stay time (integrated value) and a total stay time (maximum value) is calculated as the total stay time per sell zone; however, either one may be used. The total stay time is an example of the sum of measurement times.

(4) Internal Configuration of Purchase Analysis System 1

Next, an internal configuration of the purchase analysis system 1 will be described with reference to the block diagram of FIG. 10.

Figure 10:
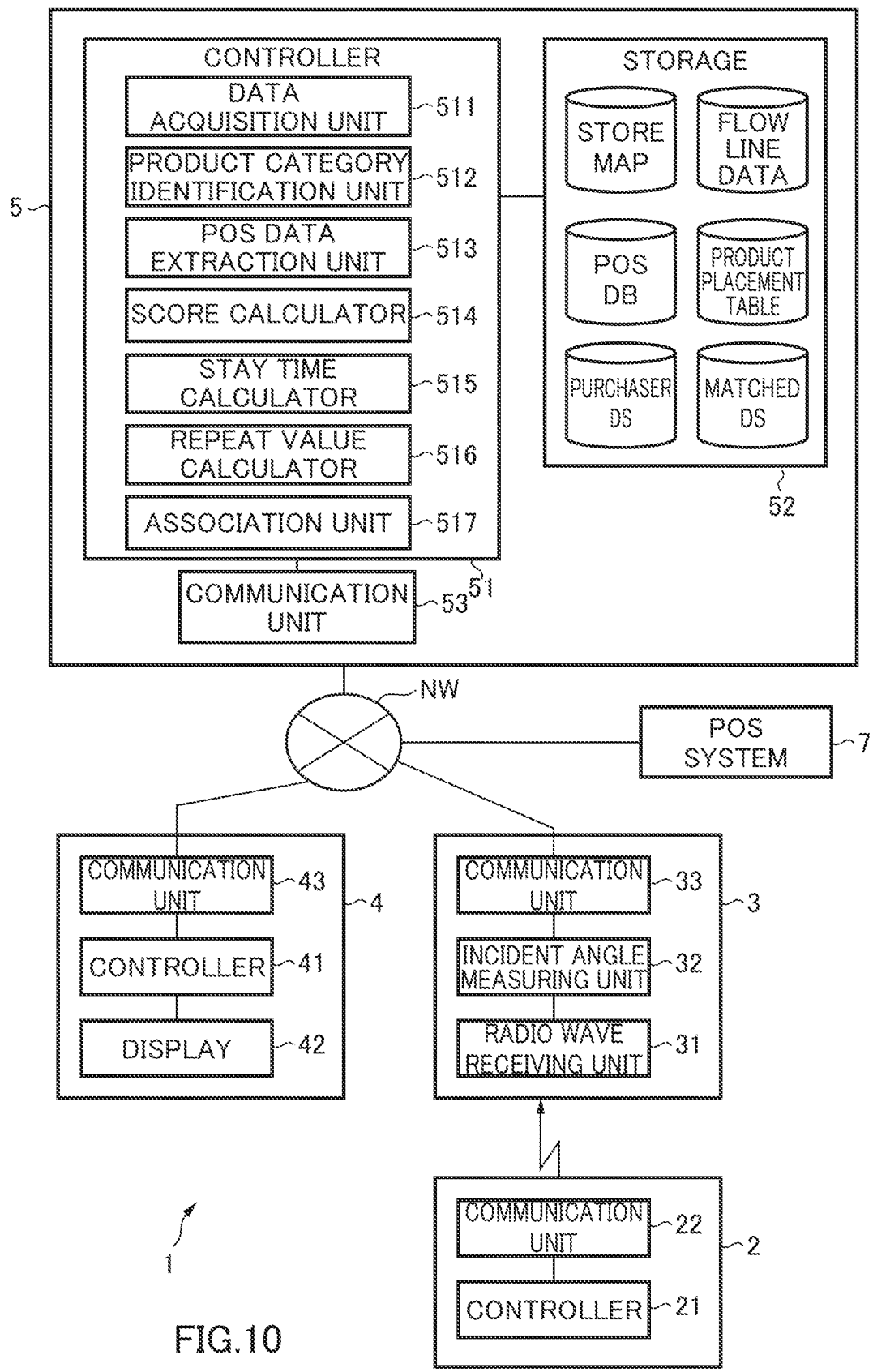
FIG. 10 is a block diagram showing an internal configuration of each device of the purchase analysis system of the embodiment.

As shown in FIG. 10, the radio tag 2 includes a controller 21 and a communication unit 22.

The controller 21 is composed mainly of a microcontroller and controls the whole radio tag 2. In one example, the controller 21 processes a reception signal and a transmission signal (processes a baseband signal).

The communication unit 22 is an interface for communicating with the receiver 3. In one example, the communication unit 22 modulates a transmission signal (e.g., a beacon signal) to the receiver 3 and transmits this signal in a broadcast manner in accordance with BLE, for example. The beacon signal contains a tag ID of the radio tag 2.

As shown in FIG. 10, the receiver 3 includes a radio wave receiving unit 31, an incident angle measuring unit 32, and a communication unit 33.

The radio wave receiving unit 31 includes an antenna for receiving a beacon signal (radio wave) that is transmitted from the radio tag 2.

The incident angle measuring unit 32 measures an incident angle of a radio wave that is received from the radio tag 2 by the radio wave receiving unit 31.

The communication unit 33 is an interface for communicating with the radio tag 2 and the server 5. In one example, the communication unit 33 demodulates a reception signal from the radio tag 2. In addition, the communication unit 33 associates information of the incident angle, which is measured by the incident angle measuring unit 32, with the tag ID contained in the received beacon signal and transmits them to the server 5 via the network NW.

As shown in FIG. 10, the store terminal 4 includes a controller 41, a display 42, and a communication unit 43.

The controller 41 is composed mainly of a microcontroller and controls the whole store terminal 4.

In one example, the controller 41 requests flow line data, a POS database, a purchase data set, a matched data set, etc., to receive these data via the communication unit 43 and to display them.

The display 42 includes a display panel, such as a liquid crystal display (LCD) panel, and a driving circuit for driving the display panel based on display data acquired from the server 5.

In one example, the controller 41 executes a predetermined program to display flow line data per tag ID, POS data, etc., on the display 42.

The communication unit 43 functions as a communication interface for communicating with the server 5 via the network NW.

As shown in FIG. 10, the server 5 includes a controller 51, a storage 52, and a communication unit 53.

The controller 51 is composed mainly of a microcontroller and controls the whole server 5. In one example, the microcontroller of the controller 51 executes the matching program, whereby the controller 51 functions as a data acquisition unit 511, a product category identification unit 512, a POS data extraction unit 513, a score calculator 514, a stay time calculator 515, a repeat value calculator 516, and an association unit 517.

The data acquisition unit 511 (an example of a first acquisition unit or a second acquisition unit) acquires flow line data (refer to FIG. 5; an example of flow line information) of each of a plurality of tag IDs for identifying radio tags 2 of respective purchasers. The flow line data contains position information showing positions in the store with the lapse of time of the corresponding radio tag 2. At this time, the data acquisition unit 511 acquires flow line data per tag ID based on information of an incident angle per tag ID, which is received from the receiver 3.

The data acquisition unit 511 also acquires a POS database (refer to FIG. 4) from the POS system 7. The POS database contains a plurality of POS data, in each which a sales time when products were sold, the product categories of the respective products sold at the sales time, and a checkout counter number are associated with each other.

The product category identification unit 512 (an example of a product category identification unit) identifies the product category that is assigned to the zone in the store, through which each radio tag 2 passed, from the product placement table (refer to FIG. 3) and the flow line data of each tag ID. In short, the product category identification unit 512 identifies the product category that is associated with the flow line data of a purchaser.

The POS data extraction unit 513 (an example of a second acquisition unit) determines an entering time (checkout counter entering time) at which the radio tag 2 identified by a corresponding tag ID enters the checkout zone RZ, from the flow line data of the corresponding tag ID. The POS data extraction unit 513 then extracts POS data from the POS database, as POS range data (described later). This POS data contains a sales time during a predetermined period including the checkout counter entering time.

The POS data extraction unit 513 may identify a cash register (an example of a payment machine) at which payment for the product was made, from the flow line data of the corresponding tag ID. Then, the POS data extraction unit 513 may extract, from the POS database, POS data having the checkout counter number of the identified cash register and containing a sales time during a predetermined period before and after the checkout counter entering time.

The score calculator 514 (an example of a third acquisition unit) calculates a score for a processing target ID, which is one of the plurality of the tag IDs, from the product category contained in the POS data acquired by the data acquisition unit 511 and from the product category identified by the product category identification unit 512. In one example, the score calculator 514 calculates the score of each POS data from the number of the product categories contained in each POS data of the POS database and from the number of the product categories agreeing with the product categories contained in each POS data among the product categories that are identified for the processing target ID by the product category identification unit 512.

Herein, the score is a value showing a probability of the POS data being data that should be associated with the processing target ID, and it is an example of a degree of association. In other words, due to the flow line of a radio tag 2 of a certain tag ID being associated with the flow line of a purchaser in one-to-one correspondence, the score shows a degree of association of the flow line data of the purchaser with the POS data. Note that a specific example of calculating the score will be described later.

For example, the score calculator 514 may adjust the score by using the total stay time that is calculated with respect to one or each of the plurality of the zones assigned to the product categories contained in the POS data, which is a target of the score calculation.

In another example, the score calculator 514 may adjust the score by using a repeat value (described later) that is calculated by the repeat value calculator 516 with respect to one or each of the plurality of the zones assigned to the product categories contained in the POS data, which is a target of the score calculation.

In one example, one or a plurality of zones that are identified from the flow line data of the purchaser having passed therethrough may not contain a zone that is set for the product category contained in the POS data, which is acquired by the POS data extraction unit 513. In this case, the score calculator 514 may adjust the score of the corresponding POS data so that it will be small.

In addition, as shown in FIG. 3, the store may include two types of zones: a zone in which products of a product category having a perfectly match flag "True" (an example of a first setting) are placed (that is, a zone in which there is no possibility of changing products to be placed), and a zone in which products of a product category having a perfectly match flag "False" (an example of a second setting) are placed (that is, a zone in which there is a possibility of changing products to be placed). For example, a sell zone of a product category having the perfectly match flag "True" is fixed. In this state, the score calculator 514 may adjust the score so that it will be small in the following case: zones that are identified from the flow line data of a purchaser having passed therethrough do not include a zone that is set for the product category having the perfectly match flag "True" among the product categories contained in the POS data, which is acquired by the POS data extraction unit 513.

Assuming that virtual points VP (refer to FIG. 8) are defined at points of intersection of virtual lines arranged in grid in the store, the stay time calculator 515 (an example of a measurement unit or an aggregation unit) measures a stay time at each virtual point that exists in a predetermined region centering at the position of each radio tag 2, and it then calculates a total stay time in each zone. The stay time is time during which a virtual point continuously exists in the predetermined region in accordance with movement of a purchaser. That is, the total stay time in a certain zone is the sum of the stay times that are calculated with respect to the respective plurality of virtual points contained in the certain sell zone.

The repeat value calculator 516 (an example of a number-of-repetitions calculator) calculates the number of repetitions that the radio tag 2 identified by a tag ID enters and leaves each of the plurality of the zones, as a repeat value, from the flow line data of the tag ID.

The association unit 517 associates processing target ID with one of POS data of the POS database, based on the score calculated by the score calculator 514. That is, the association unit 517 associates the flow line data of a purchaser (equivalent to the flow line data of the corresponding radio tag 2) with the POS data.

The storage 52 is, for example, a mass storage device, such as a hard disk drive (HDD), and it stores a store map, flow line data (refer to FIG. 5), a POS database (POS DB) (refer to FIG. 4), a product placement table (refer to FIG. 3), a purchaser data set (purchaser DS), and a matched data set (matched DS). Each data in the storage 52 is appropriately updated, added, or deleted upon being accessed by the controller 51.

The store map contains geographic information (information of XY coordinates) regarding boundaries between the sell zones of the floor of the store. For example, a sell zone corresponding to the position of the radio tag 2 or a sell zone containing each virtual point VP (refer to FIG. 9) is identified by referring to the store map.

Although details will be described later, the purchaser data set is a database of tag IDs of the radio tags 2, each of which is associated with flow line data, a checkout counter entering time, and a checkout counter number, and it is created in executing the matching program.

Although details will be described later, the matched data set is data in which each POS data of the POS database is associated with each tag ID of the radio tag 2, and it is a result of executing the matching program (that is, a matched result).

The communication unit 53 functions as a communication interface for communicating with the receiver 3, the store terminal 4, and the POS system 7 via the network NW.

(5) Matching Process Executed By Server 5

Next, the matching process that is executed by the server 5 will be described with reference to FIGS. 11 to 23.

As described above, the matching process is a process for associating each tag ID with one of POS data contained in the POS database, based on flow line data of each of the tag IDs for identifying the respective radio tags (process of the matching program), and it is executed by the controller 51 of the server 5.

The following description assumes that N number of store visitors (purchasers) purchased products in a store by using carts to which radio tags are attached. In this situation, N number of radio tags having different tag IDs are respectively assigned to the N number of purchasers. The server 5 measures the positions of the radio tags having different tag IDs and obtains flow line data of the radio tags of the respective tag IDs (refer to FIG. 5; equivalent to flow line data of different purchasers). Specifically, flow line data FL(1) to FL(N) (described later) are obtained for N number of tag IDs 1 to N, respectively.

The server 5 also acquires a POS database that is composed of N pieces of POS data, as sales information of the N number of purchasers, from the POS system 7. Specifically, the server 5 acquires a POS database that is composed of N pieces of POS data P-1 to P-N, as shown in FIG. 4.

The server 5 acquires flow line data FL(1) to FL(N) for N number of tag IDs 1 to N, respectively, acquires a POS database composed of N pieces of POS data P-1 to P-N, and then executes the matching process, which will be described below. Executing the matching process produces a matched data set in which the N number of tag IDs are associated with the N pieces of POS data in one-to-one correspondence.

(5-1) Overall Flow

Figure 11:
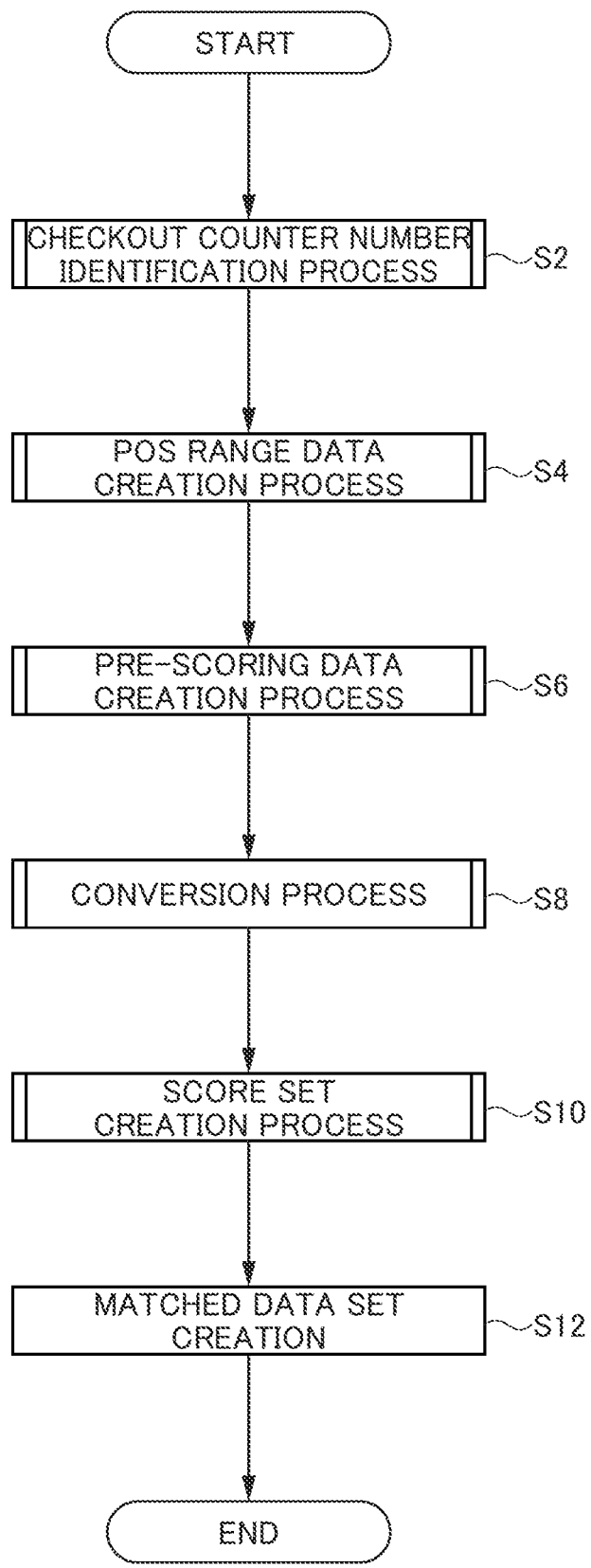
FIG. 11 is a flowchart of a matching process executed by a server.

FIG. 11 shows a flowchart of the whole matching process executed by the server 5. Although each process shown in the flowchart in FIG. 11 will be detailed later, the matching process includes a sequence of the following processes:

Checkout Counter Number Identification Process (Step S2)

The checkout counter number identification process is a process for identifying a checkout counter number of a checkout counter, at which a purchaser corresponding to each tag ID made a payment of products, from the flow line data of each tag ID.

POS Range Data Creation Process (Step S4)

The POS range data creation process is a process for creating POS range data of each tag ID. The POS range data is composed of POS data, each containing a sales time during a predetermined period before and after a checkout counter entering time.

Pre-Scoring Data Creation Process (Step S6)

The pre-scoring data creation process is a process for creating pre-scoring processed data of each POS data that is contained in the POS range data of each tag ID. The pre-scoring processed data is data to be reflected in a score for associating (matching) each tag ID with POS data.

Conversion Process (Step S8)

The conversion process is a process for converting data of each tag ID into data of each POS data (purchase data set, which will be described later). The data of each tag ID contains each POS data contained in the POS range data and the pre-scoring processed data in an associated manner. The data of each POS data contains each tag ID and the pre-scoring processed data in an associated manner.

In more detail, the POS range data of a plurality of tag IDs in which the checkout counter entering times are close to each other contain duplicated POS data. In view of this, the conversion process converts the relation between the POS data contained in the POS range data and the pre-scoring processed data, of each of the plurality of tag IDs, into the relation between the tag ID and the pre-scoring processed data, of each individual POS data.

Score Set Creation Process (Step S10)

The score set creation process is a process for creating a score set. The score set is data that stores a score for each tag ID. The score is a value showing a probability that each POS data of the POS range data of a tag ID is POS data that should be associated with the tag ID.

Matched Data Set Creation Process (Step S12)

The matched data set creation process is a process for creating a matched data set by referring to the score set. The matched data set contains tag IDs that are respectively associated with POS data of the POS database.

(5-2) Checkout Counter Number Identification Process

Figure 12:
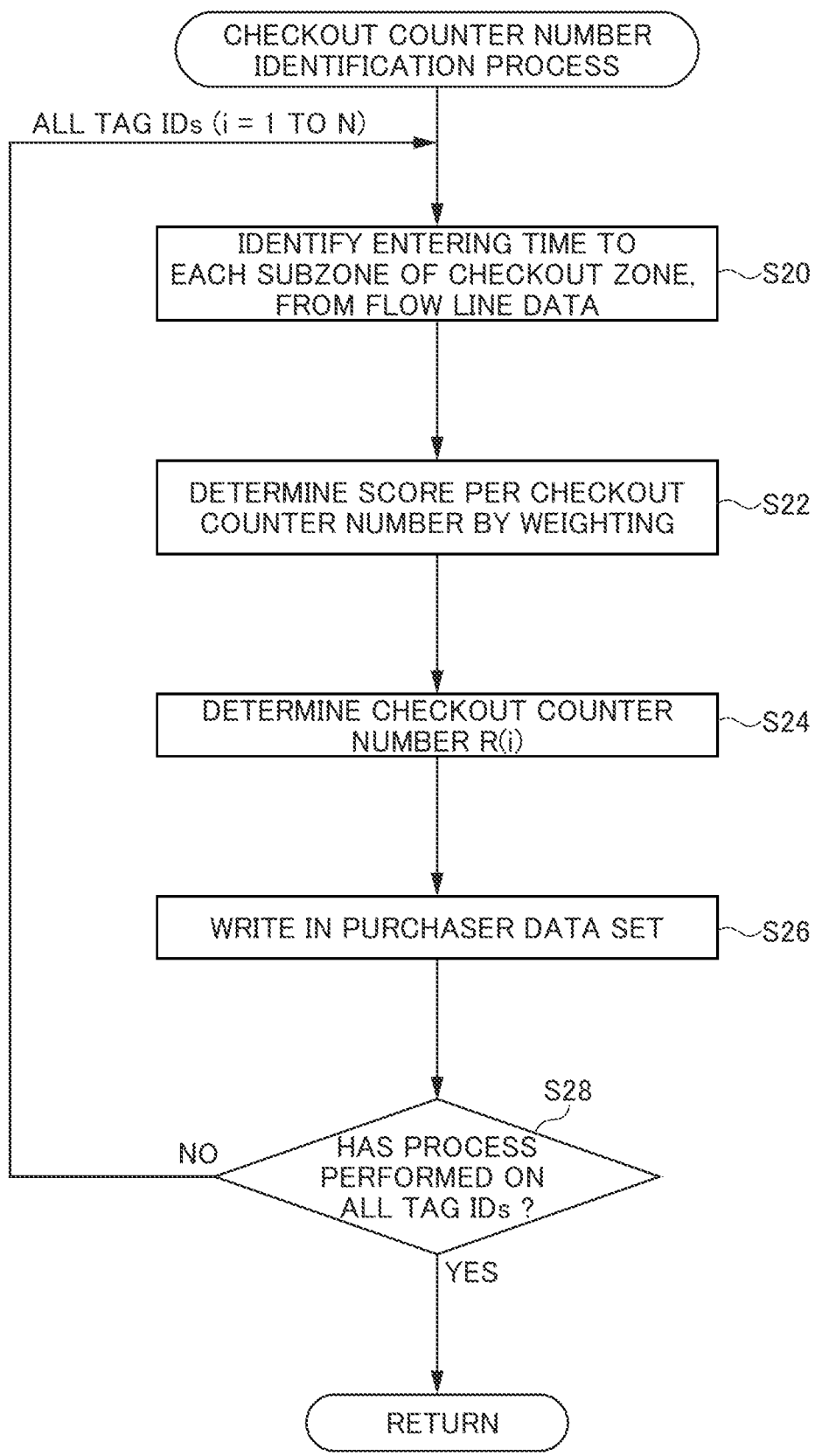
FIG. 12 is a flowchart of a checkout counter number identification process in FIG. 11.

First, the checkout counter number identification process (step S2) in FIG. 11 will be specifically described with reference to FIGS. 12 to 14. FIG. 12 is a flowchart of the checkout counter number identification process in FIG. 11. FIG. 13 shows an example of data components of a purchaser data set FIG. 14 is an enlarged view of the checkout zone RZ in the plan view of FIG. 2.

As described above, the checkout counter number identification process is a process for identifying a checkout counter number of a checkout counter at which a purchaser corresponding to each tag ID made a payment of products, from the flow line data of each tag ID. This process is executed by the data acquisition unit 511 of the controller 51. In more detail, the data acquisition unit 511 acquires a checkout counter number of the checkout zone RZ in the store area, which is identified from the flow line data of the radio tag 2. As to a store having one checkout counter, the checkout counter number identification process is not required.

The checkout counter number identification process produces a purchaser data set illustrated in FIG. 13. Each record in the purchaser data set stores a value of each of fields "TAG ID", "FLOW LINE DATA", "CHECKOUT COUNTER ENTERING TIME", and "CHECKOUT COUNTER NUMBER". This data set is created on the premise that the flow line data FL(1) to FL(N) respectively corresponding to the N number of tag IDs 1 to N have already been acquired, as described above. In the checkout counter number identification process, a checkout counter entering time and a checkout counter number corresponding to each tag ID are identified and are written in the purchaser data set.

Figure 14:
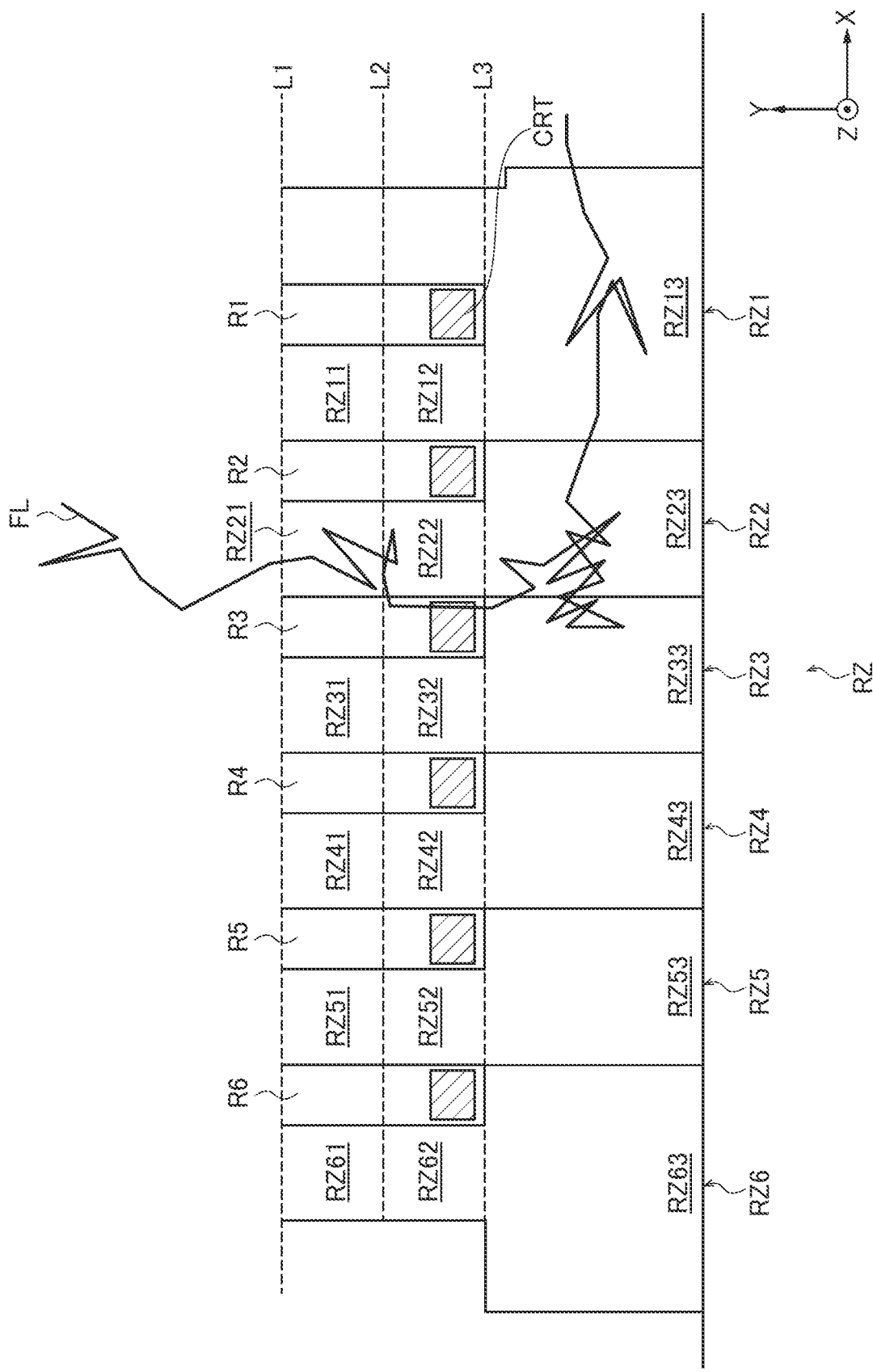
FIG. 14 is an enlarged view of checkout zones in the plan view of FIG. 2.

FIG. 14 shows an example of arranging six checkout counters (cash registers CRT) of checkout counter numbers R1 to R6. The process is performed by dividing the checkout zone RZ into small sections in order to identify the checkout counter number. This example shows a case of arranging six checkout counters (checkout counter numbers R1 to R6) in the checkout zone RZ. The zones respectively corresponding to the checkout counters of the checkout counter numbers R1 to R6 are checkout zones RZ1 to RZ6.

Figure 6:
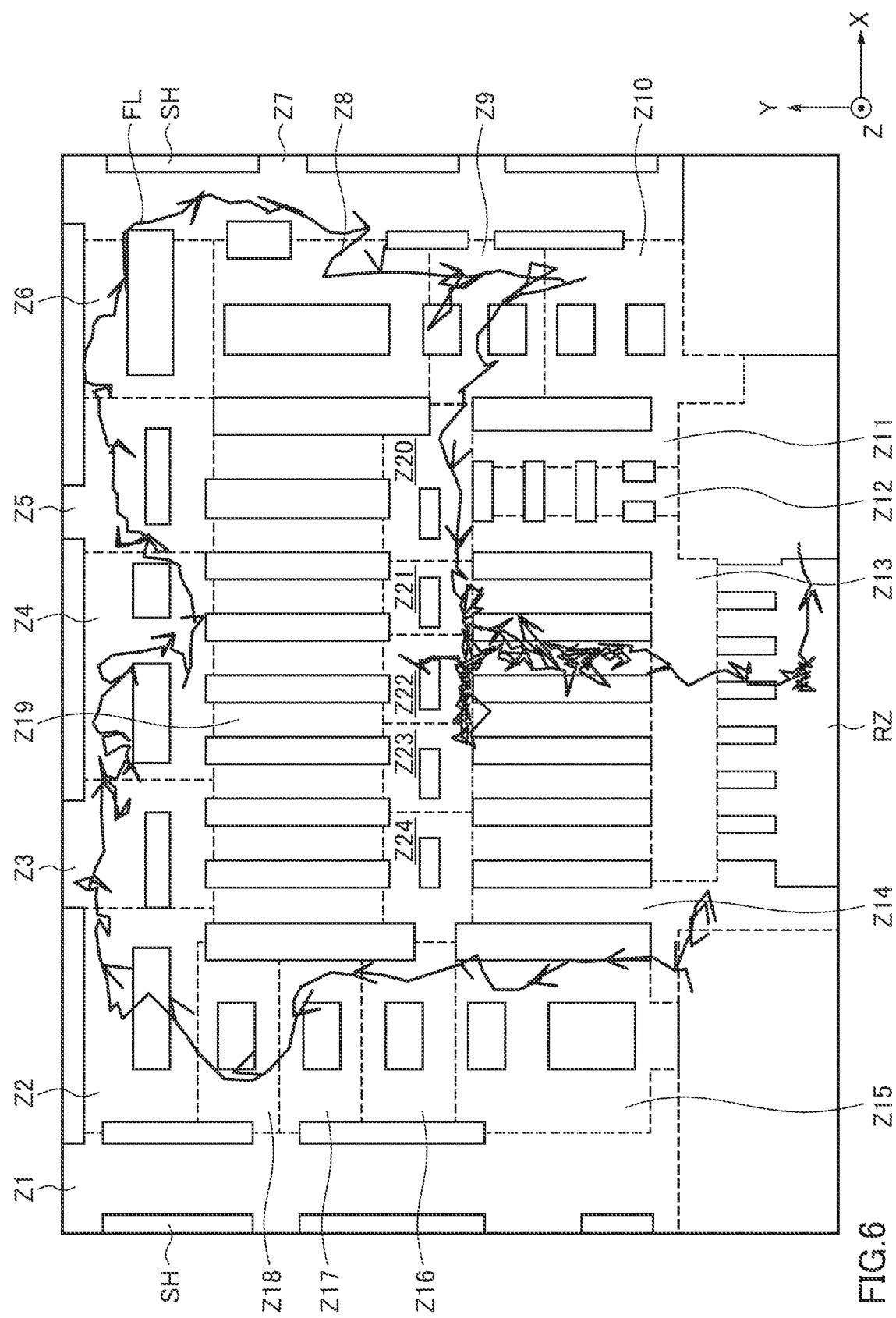
FIG. 6 shows an example of a flow line of one radio tag in the plan view of FIG. 2.

The virtual line L1 is set at a boundary between the checkout zone RZ and an adjacent sell zone (sell zone Z13 in the example in FIG. 6). The point of time when the radio tag passes through the virtual line L1 in a −Y direction is the checkout counter entering time and is identified from the flow line data of each tag ID. In one example, the point of time when the flow line FL shown in FIG. 14 passes through the virtual line L1 is the checkout counter entering time of a tag ID of this flow line FL.

In order to enhance identification accuracy of the checkout counter number, it is preferable to perform the process by subdividing the checkout zones RZ1 to RZ6 corresponding to the respective checkout counter numbers, in the Y-axis direction. This is due to considering a case in which the position of the radio tag attached to a cart may be separated from a purchaser when the purchaser moves the cart aside in placing products in the cart on a checkout counter.

FIG. 14 shows an example of subdividing the checkout zones RZ1 to RZ6 by two virtual lines L2 and L3 that are offset in the Y-axis direction in parallel to the virtual line L1. Specifically, FIG. 14 shows an example of subdividing the checkout zones RZ1 to RZ6 as follows: the checkout zone RZ1 is subdivided into three subzones RZ11 to RZ13, the checkout zone RZ2 is subdivided into three subzones RZ21 to RZ23, the checkout zone RZ3 is subdivided into three subzones RZ31 to RZ33, the checkout zone RZ4 is subdivided into three subzones RZ41 to RZ43, the checkout zone RZ5 is subdivided into three subzones RZ51 to RZ53, and the checkout zone RZ6 is subdivided into three subzones RZ61 to RZ63.

In the condition that the checkout zones RZ1 to RZ6 of the respective checkout counter numbers are subdivided into the subzones, the checkout counter number is determined from the flow line data by evaluating a score that is weighted in accordance with which subzone a purchaser entered. The weight is preferably set so as to be higher as the entrance to the checkout zone RZ is closer (that is, as the virtual line L1 is closer).

In one example, a weight to a corresponding checkout counter number is 1.2 as to entering each of the subzones RZ11 to RZ61, it is 1.0 as to entering each of the subzones RZ12 to RZ62, and it is 0.8 as to entering each of the subzones RZ13 to RZ63. Under these conditions, in the example in FIG. 14, the flow line FL shows that the radio tag enters the subzone RZ21, passes through the subzone RZ22, and then enters the subzone RZ33. Thus, the weighted score for the checkout counter number R2 is 2.2, and the weighted score for the checkout counter number R3 is 0.8, whereby the checkout counter number of this flow line FL is identified as R2.

In the case in which the weighted scores for two or more checkout counter numbers are the same, the checkout counter number is determined by referring to the subzone at the time of entering the checkout zone RZ (that is, the subzone where the entering time is the earliest). That is, entering the subzones RZ11, RZ21, RZ31, RZ41, RZ51, and RZ61 determines the checkout counter number to be R1, R2, R3, R4, R5, and R6, respectively.

With reference to FIG. 12, the server 5 performs the processes in steps S20 to S26 of the flowchart in FIG. 12, on all tag IDs "i" (i=1 to N) (step S28).

The server 5 first identifies an entering time to each subzone of the checkout zone RZ, from flow line data FL(i) (step S20). The server 5 then determines a weighted score for each checkout counter number (step S22) and determines a checkout counter number R(i) (one of the checkout counter numbers R1 to R6 in the example of this embodiment) by using the weighted score (step S24), as described above.

The server 5 writes the checkout counter entering time TE(i) (that is, the time of entering one of the subzones RZ11 to RZ61 in FIG. 14), which is identified in step S20, and the checkout counter number R(i), which is determined in step S24, in the purchaser data set (FIG. 13) in an associated manner (step S26).

Executing the processes in the flowchart in FIG. 12 produces the purchaser data set in FIG. 13. The purchaser data set is referred to in the processes in step S4 and subsequent steps in FIG. 11.

The above-described identification of the checkout counter number using the weighted score is merely an example. One of the checkout counter numbers R1 to R6 may be more simply identified in accordance with which checkout zone of the checkout zones RZ1 to RZ6 a purchaser entered.

In addition, although each of the checkout zones RZ1 to RZ6 is subdivided into three subzones, the number of the subzones is not limited to this example. The weighted score may be calculated by subdividing each checkout zone into two or any number of four or more subzones.

(5-3) POS Range Data Creation Process

Figure 15:
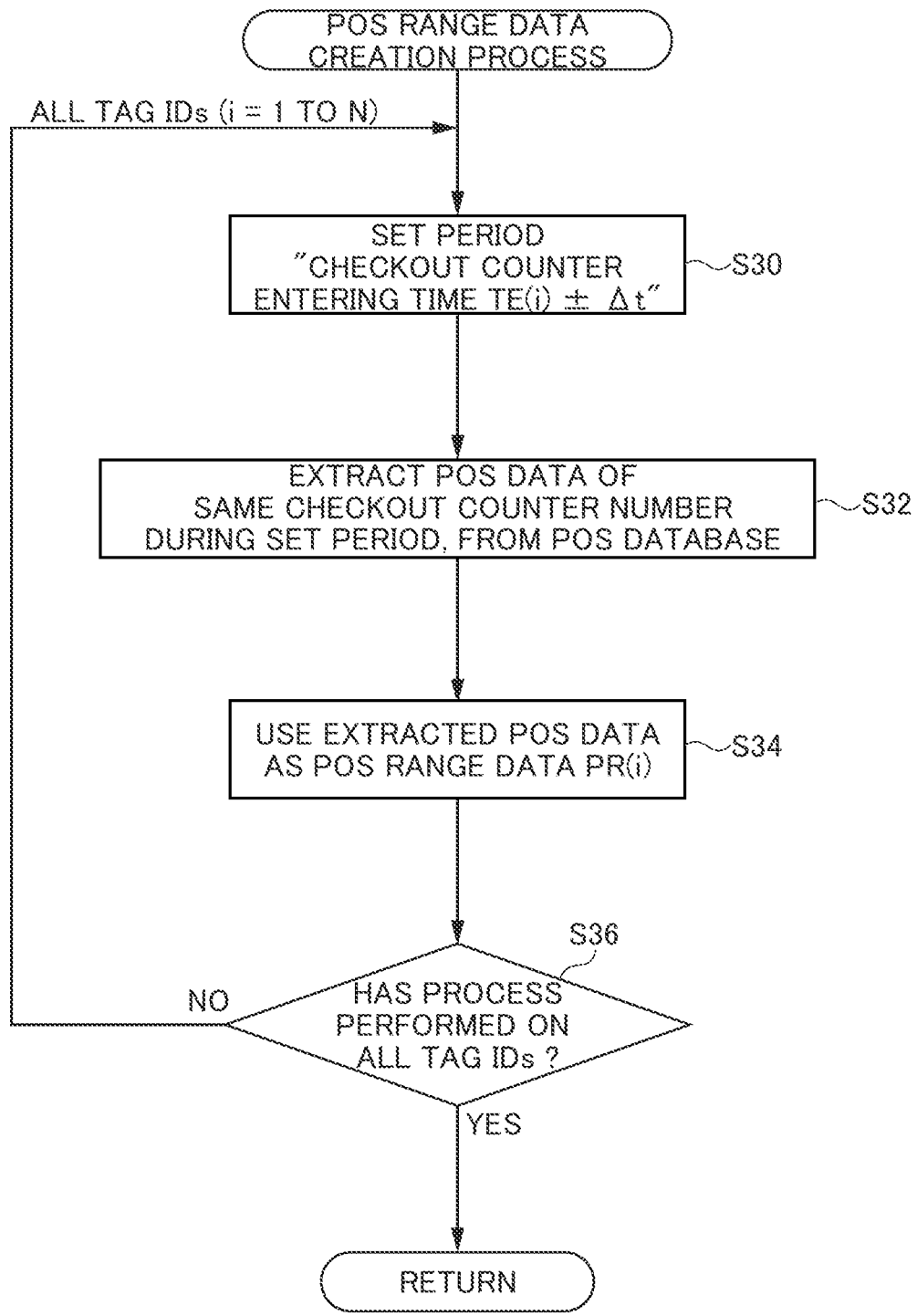
FIG. 15 is a flowchart of a POS range data creation process in FIG. 11.
Figure 16:
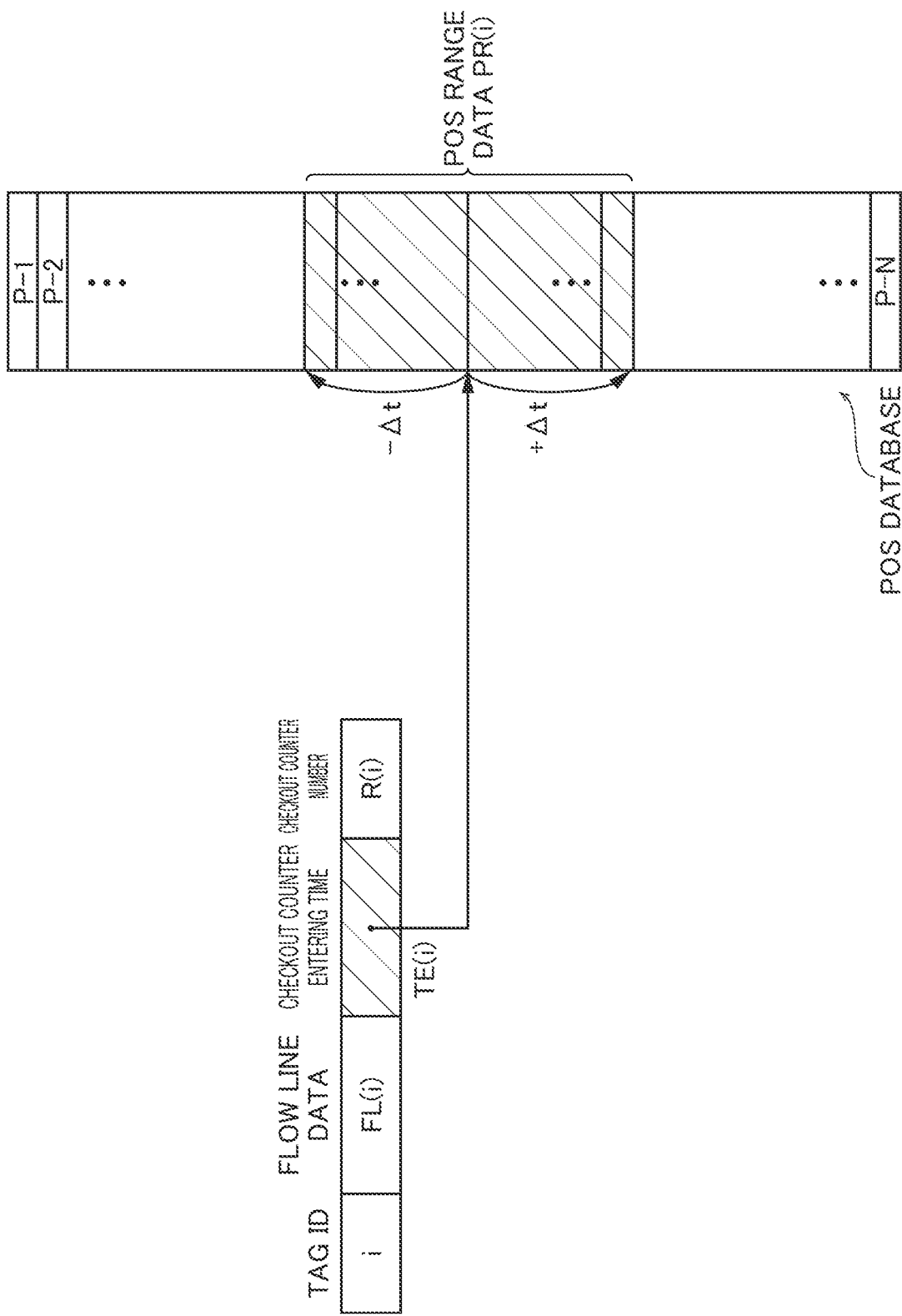
FIG. 16 illustrates POS range data.

Next, the POS range data (step S4) creation process in FIG. 11 will be specifically described with reference to FIGS. 15 and 16. FIG. 15 is a flowchart of the POS range data creation process in FIG. 11. FIG. 16 illustrates POS range data.

As described above, the POS range data creation process is a process for creating POS range data of each tag ID. The POS range data is composed of POS data, each containing a sales time during a predetermined period (predetermined range) before and after a checkout counter entering time. This process is executed by the data acquisition unit 511 of the controller 51. In more detail, the data acquisition unit 511 acquires POS data containing the checkout counter number from the POS database. The checkout counter number is identified by the checkout counter number identification process. The data acquisition unit 511 also acquires POS data containing a sales time during the predetermined range including the entering time to the checkout zone RZ in the store area, from the POS database. The checkout zone RZ is identified from the flow line data of the radio tag 2. Details are specifically described below.

With reference to FIG. 15, the server 5 performs the processes in steps S30 to S34 of the flowchart in FIG. 15, on all tag IDs "i" (i=1 to N) (step S36).

The server 5 first sets a period $TE(i) \pm \Delta t$ relative to the checkout counter entering time $TE(i)$ of a tag ID "i" (step S30). With reference to FIG. 16, the checkout counter entering time $TE(i)$ of the tag ID "i" have already been identified in the checkout counter number identification process, and a predetermined period (from "$TE(i)-\Delta t$" to "$TE(i)+\Delta t$") before and after the checkout counter entering time $TE(i)$ is set.

The "$\Delta t$" is set based on the checkout counter entering time of the radio tag, in order to limit (narrow down) the candidates for POS data to be matched with the tag ID, and it can be set to any value. In general, there is a wide variety of specifications for POS systems, and the sales time may be recorded in the unit of minute or in the unit of second. As to a sales time in the unit of minute of the POS data, the "$\Delta t$" is preferably set to a relatively long time, for example, in a range of 60 to 120 seconds. As to a sales time in the unit of second of the POS data, the "$\Delta t$" is preferably set to a relatively short time, for example, in a range of 20 to 60 seconds.

Then, the server 5 extracts, from the POS database, POS data of the same checkout counter number as the checkout counter number R(i) of the tag ID "i" at the sales time in the period set in step S30 (step S32). The server 5 uses the extracted POS data as POS range data PR(i) (step S34). As shown in FIG. 16, N pieces of POS data P-1, P-2, . . . , and P-N are arrayed in the order of sales time in the POS database. On the basis of this POS database, the POS range data PR(i) contains all pieces of POS data, in which the sales times are within the predetermined period (from "$TE(i)-\Delta t$" to "$TE(i)+\Delta t$") relative to the checkout counter entering time $TE(i)$ and the checkout counter numbers are the same.

The POS range data is created with respect to each tag ID, which enables narrowing down the candidates for POS data to be matched, with respect to each tag ID. In other words, this enables excluding pieces of POS data at sales times separated from the checkout counter entering time $TE(i)$ of the tag ID "i", from the candidates.

(5-4) Pre-Scoring Data Creation Process

Next, the pre-scoring data creation process (step S6) in FIG. 11 will be specifically described with reference to FIGS. 17 and 18.

Figure 17:
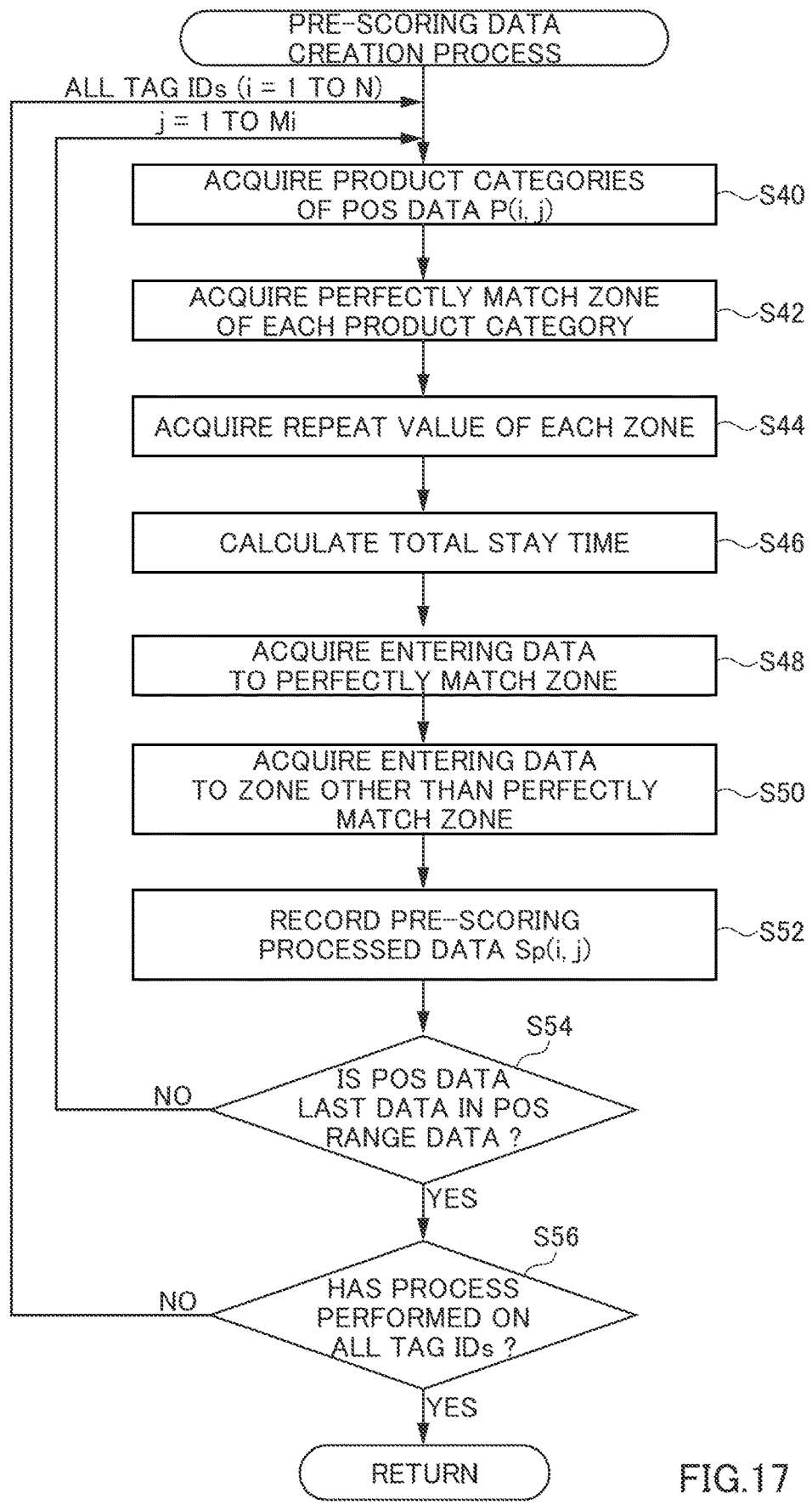
FIG. 17 is a flowchart of a pre-scoring data creation process in FIG. 11.

FIG. 17 is a flowchart of the pre-scoring data creation process in FIG. 11. FIG. 18 shows association between each POS data of POS range data and pre-scoring processed data of a purchaser of a certain tag ID.

As described above, the pre-scoring data creation process is a process for creating pre-scoring processed data with respect to each POS data contained in the POS range data of each tag ID. The pre-scoring processed data is data to be reflected in a score that is used in associating (matching) one of POS data in the POS database with each tag ID.

Specifically, as shown in FIG. 18, assuming that the POS range data PR(i), which is created for the tag ID "i", contains $M_i$ pieces of POS data P(i, 1), P(i, 2), . . . , and $P(i, M_i)$, pre-scoring processed data Sp(i, 1), Sp(i, 2), . . . , and Sp(i, $M_i$) are created for the respective POS data. Note that the checkout counter entering time differs for each tag ID, and therefore, the number $M_i$ of pieces of POS data contained in the POS range data can differ per tag ID.

In the case in FIG. 18, pre-scoring processed data Sp(i, j) is created for the j-th POS data P(i, j) (j is an integer in the range of 1 to $M_i$) of the POS range data PR(i) of the tag ID "i". The POS data P(i, j) is equal to one of POS data contained in the POS database. That is, the relation "P(i, j)$\in$ {P-1, P-2, . . . , and P-N}" is established for any "i" (i=1 to N) and any "j" (j=1 to $M_i$).

The pre-scoring processed data Sp(i, j) is data composed of a plurality of the following data. These data are acquired or calculated from the flow line data FL(i) of the tag ID "i" and the product categories contained in the POS data P(i, j).

Data of the product categories of the POS data P(i, j)
Data of the zones of the corresponding product categories
Repeat value of each of the zones
Total stay time per zone in the store
Entering data to the perfectly match zone
Entering data to the zone other than the perfectly match zone Herein, the repeat value is data of the number of repetitions of entering and leaving each zone in the store. For example, as to entering and leaving a certain zone once, the certain zone may be simply passed through; on the other hand, as to entering and leaving the certain zone repeatedly, it is highly likely that a product is picked up in the certain zone. In consideration of this, the number of repetitions of the zone of the product category of the POS data P(i, j) is preferably reflected in the score to be used in associating the tag ID "i" with the POS data by referring to the flow line data FL(i), as described later.

As described above, the total stay time per zone is the sum of the stay times at the respective virtual points in the floor of the store, with respect to each zone. A long total stay time in a certain zone can be considered to represent a high possibility that a purchaser stopped in the certain zone to select a product and picked it up. In view of this, the length of the total stay time in each zone is preferably reflected in the score to be used in associating the tag ID "i" with the POS data.

As described above, in accordance with whether the stay time (integrated value) is calculated or the stay time (maximum value) is calculated for each virtual point, one of a total stay time (integrated value) and a total stay time (maximum value) is calculated as the total stay time in each zone. Although the total stay time (maximum value) is calculated herein, the calculation is not limited thereto, and the total stay time (integrated value) may be calculated.

The perfectly match zone means a zone in which there is no possibility of changing positions of products (in short, a fixed zone), among the sell zones. In the situation that the fact of purchase of a product is recorded in the POS data, and the location of the sell zone of the product category for this product is fixed, a purchaser of this product had to pass through the corresponding sell zone. Such a sell zone is called a "perfectly match zone".

Specifically, this zone is a zone that corresponds to a product category having the perfectly match flag "True", among the product categories contained in the POS data P(i, j), in the product placement table in FIG. 3. The entering data to the perfectly match zone of the tag ID "i" shows whether a purchaser entered the perfectly match zone.

With reference to the product placement table in FIG. 3, in one example in which the product categories of the POS data P(i, j) include a product category C1 (alcoholic beverages), the corresponding perfectly match flag is "True", and the sell zones Z6 and Z15 of the product category C1 are perfectly match zones. On the condition that the radio tag of the tag ID "i" passed at least one of the sell zones Z6 and Z15, the radio tag is determined as having entered the perfectly match zone of the product category C1, from the flow line data FL(i).

The flow line of the tag ID that should be associated with the POS data P(i, j) must correspond to each product category contained in the POS data P(i, j) and must pass through the zone having the perfectly match flag "True" (that is, the perfectly match zone). For this reason, the entering data to the perfectly match zone is an important factor in associating the tag ID "i" with the POS data.

The entering data to the zone other than the perfectly match zone of the tag ID "i" shows whether a purchaser entered the zone other than the perfectly match zone.

With reference to FIG. 17, the server 5 performs the processes in steps S40 to S52 of the flowchart in FIG. 17, on all POS data P(i, j) (i=1 to N, j=1 to $M_i$) contained in the POS range data of every tag ID "i" (i=1 to N) (steps S54 and S56).

The server 5 first acquires all product categories contained in processing target POS data P(i, j) by referring to the POS database (step S40). The server 5 also acquires a sell zone (perfectly match zone) of each product category having the perfectly match flag "True" among the product categories acquired in step S40, by referring to the product placement table (FIG. 3) (step S42).

The server 5 then acquires a repeat value of each zone in the store, that is, the number of repetitions of entering and leaving each zone in the store, by referring to the flow line data FL(i) (FIG. 5) of the tag ID "i" (step S44). As shown in FIG. 5, the flow line data contains a zone in which the radio tag exists, at each positioning time. Thus, the number of repetitions of entering and leaving each zone is acquired by referring to the flow line data.

Thereafter, the server 5 calculates a total stay time at each zone in the store by referring to the flow line data FL(i) of the tag ID "i" (step S46). The method of calculating the total stay time have already been described with reference to FIG. 9 and other drawings.

Moreover, the server 5 acquires entering data to the perfectly match zone and entering data to a zone other than the perfectly match zone, from the perfectly match zone calculated from the processing target POS data P(i, j) in step S42 and from the flow line data FL(i) of the tag ID "i" (steps S48 and S50).

The server 5 records the data that are acquired or calculated in steps S40 to S50, as pre-scoring processed data Sp(i, j) of the tag ID "i", as shown in FIG. 18 (step S52).

(5-5) Conversion Process

Next, the conversion process (step S8) in FIG. 11 will be specifically described with reference to FIGS. 19 and 20.

Figure 19:
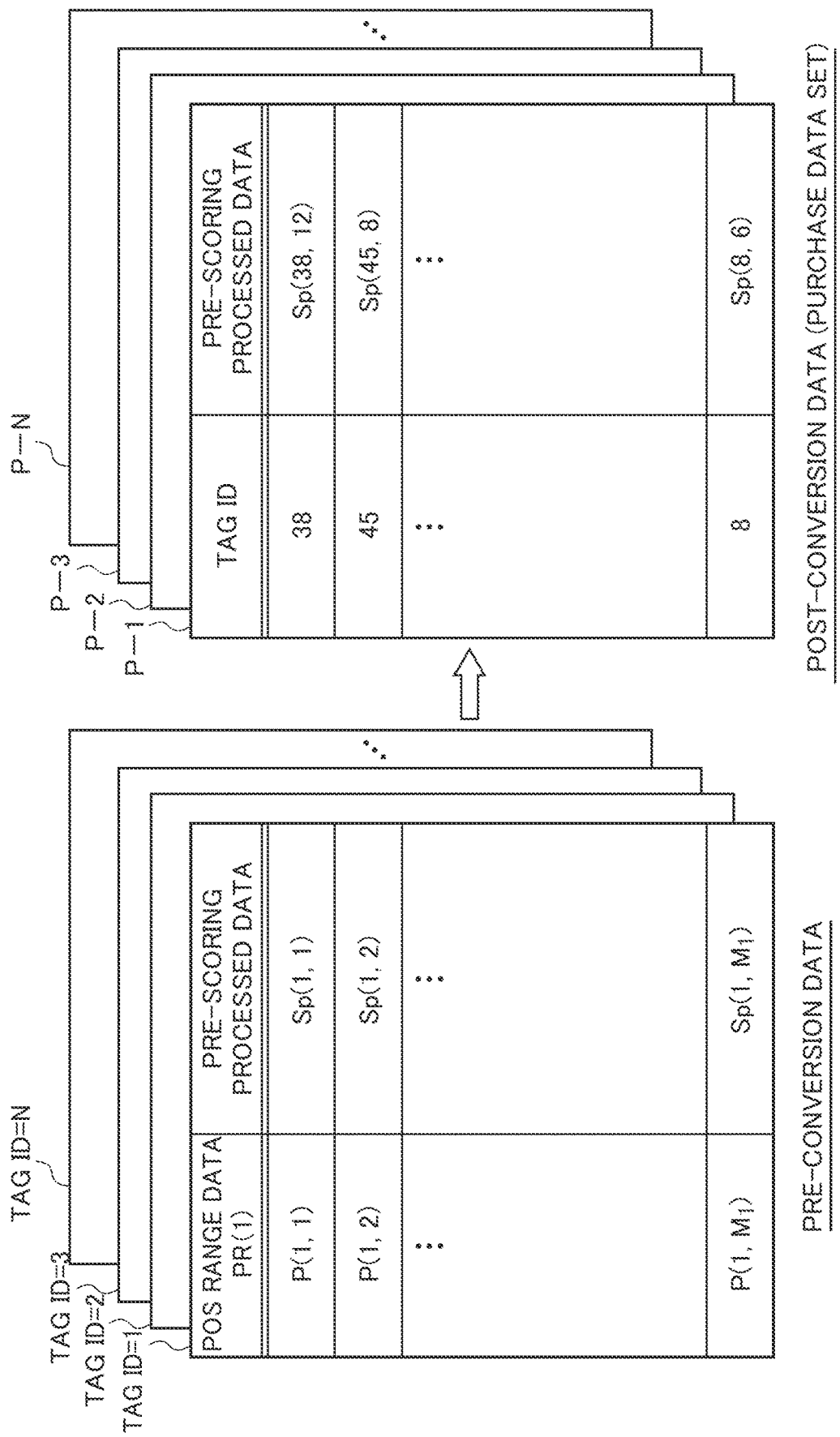
FIG. 19 shows an example of a conversion process.

FIG. 19 shows an example of the conversion process. FIG. 20 is a flowchart of the conversion process in FIG. 11.

As described above, the conversion process is a process for converting data per tag ID into data per POS data (purchase data set, which will be described later). The data of each tag ID contains each POS data contained in the POS range data and the pre-scoring processed data in an associated manner. The data of each POS data contains each tag ID and the pre-scoring processed data in an associated manner.

The pre-conversion data in FIG. 19 is data that is created in the pre-scoring data creation process. In more detail, this data contains the pre-scoring processed data in associated with each POS data of the POS range data of each of the tag IDs 1 to N. It is possible to create a score for matching by using the data in this state; however, in order to perform the process more efficiently, this data is converted into data per POS data. Specifically, as illustrated as the post-conversion data (hereinafter called a "purchase data set") in FIG. 19, this data is converted into data in which the pre-scoring processed data is associated to each tag ID, with respect to each of the POS data P-1, P-2, . . . , and P-N.

As described above, the relation "P(i, j)∈{P-1, P-2, . . . , and P-N}" is established for one of POS data P(i, j) of any "i" and any "j". In these conditions, the pre-conversion data contains duplicated POS data in the POS range data of each of the plurality of tag IDs, for example, in which the checkout counter entering times are close to each other. From this point of view, the correspondence relation between each of all POS data P(i, j) (I=1 to N, j=1 to $M_i$) and the tag ID contained in the pre-conversion data is organized by each of individual POS data P-1, P-2, . . . , and P-N. This produces the purchase data set in FIG. 19. That is, in the purchase data set, a plurality of tag IDs and the pre-scoring processed data are respectively associated with each other, for each individual POS data.

Figure 20:
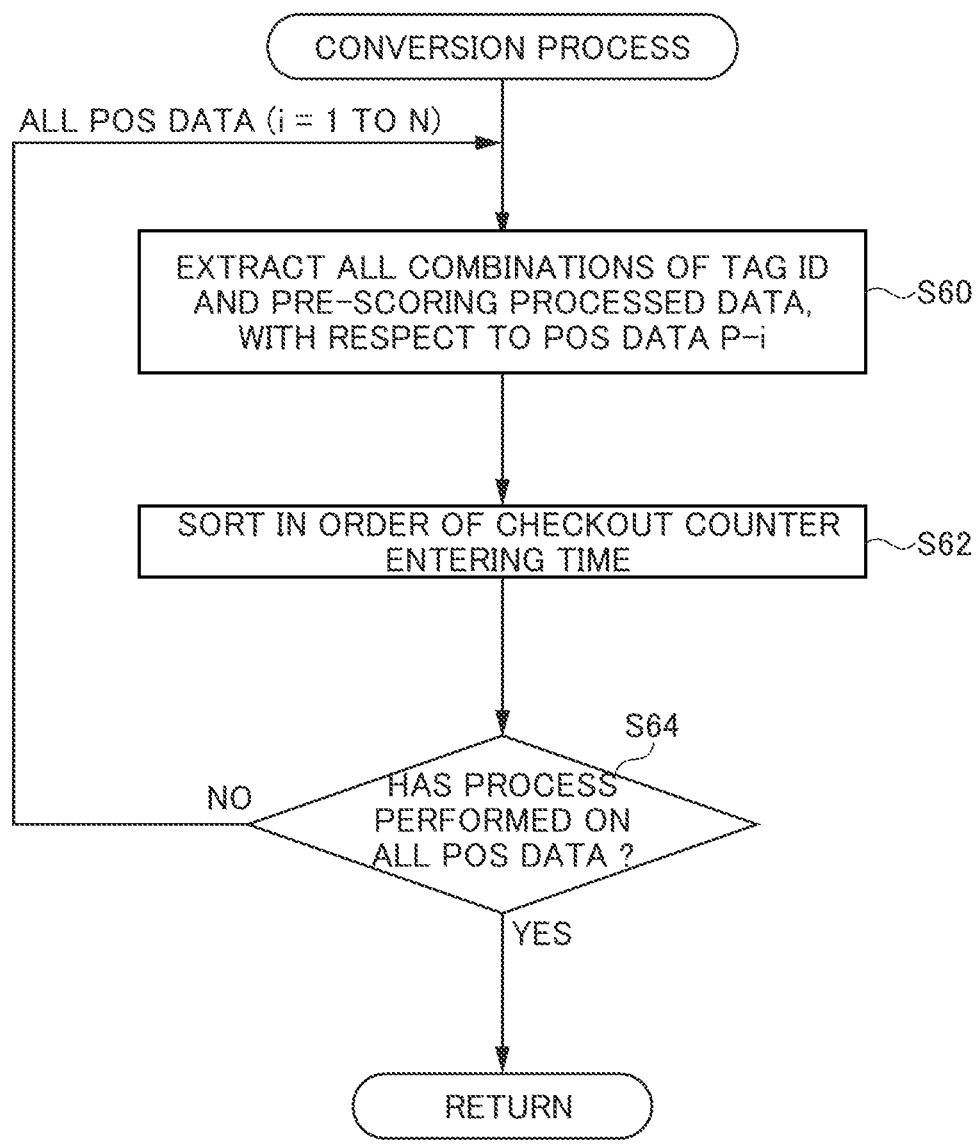
FIG. 20 is a flowchart of a conversion process in FIG. 11.

With reference to FIG. 20, the server 5 performs the processes in steps S60 and S62 of the flowchart in FIG. 20, on all POS data P-i (i=1 to N) (step S64).

The server 5 first extracts, from the pre-conversion data, all combinations of the tag ID of the same POS data as processing target POS data P-i and the pre-scoring processed data (step S60). Moreover, it is preferable that the server 5 sorts the combinations of the tag ID and the pre-scoring processed data, which are extracted for the POS data P-i, in the order of the checkout counter entering time by referring to the purchaser data set (step S62).

After the process is completed on all POS data, the purchase data set illustrated in FIG. 19 is obtained. The plurality of the tag IDs that are associated with a certain POS data in the purchase data set can be considered as candidates for a tag ID that has a high possibility of being associated with the certain POS data.

(5-6) Score Set Creation Process

Figure 21:
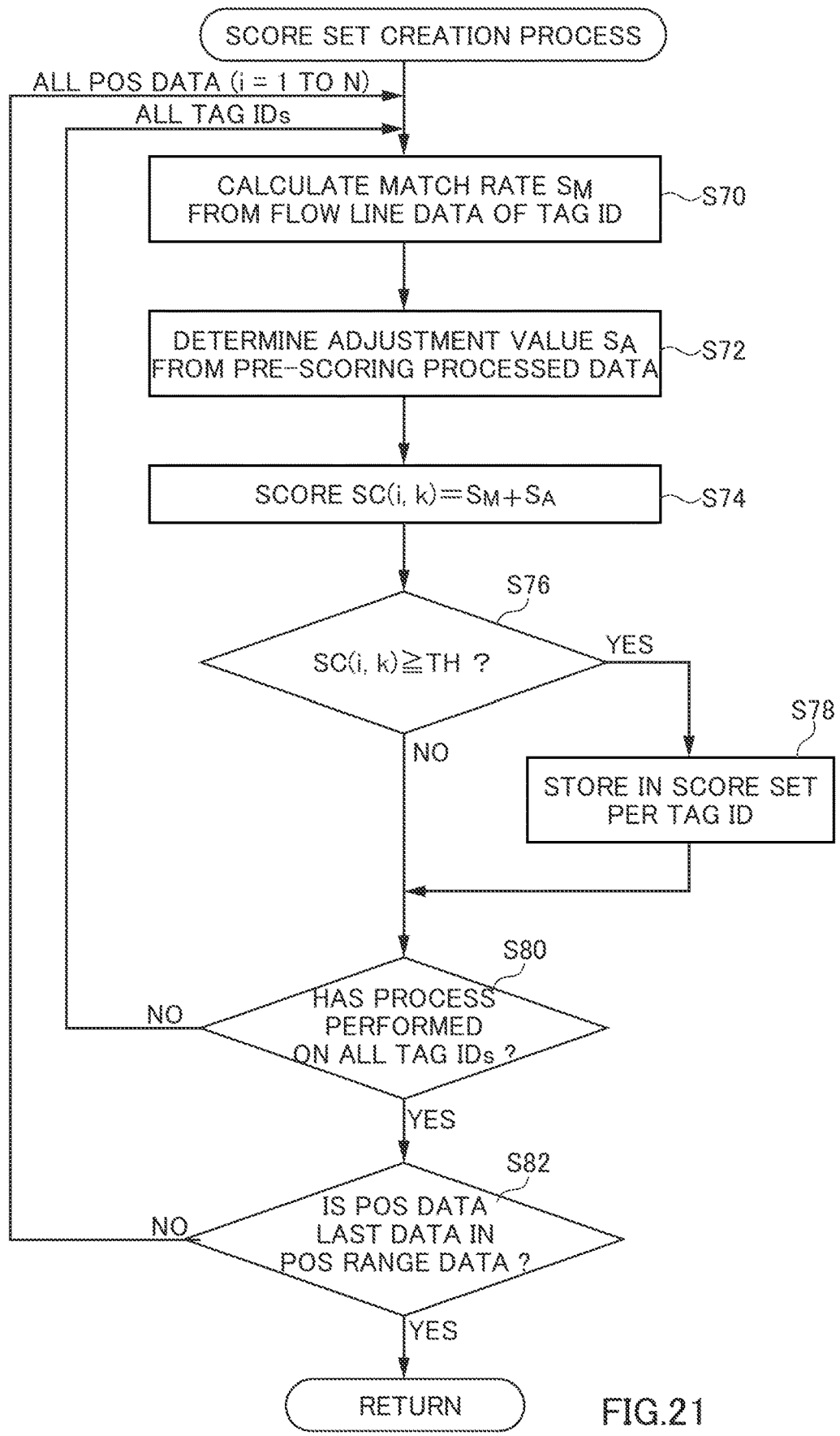
FIG. 21 is a flowchart of a score set creation process in FIG. 11.
Figure 22:
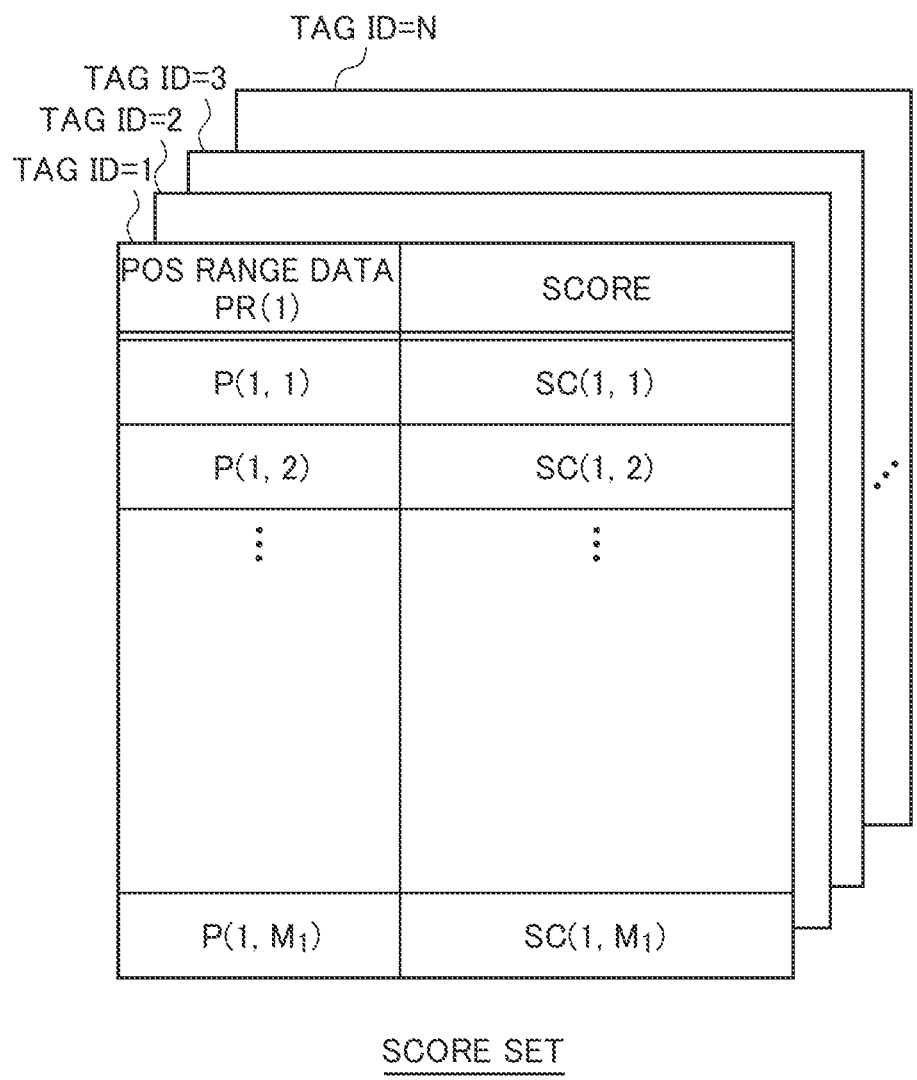
FIG. 22 shows an example of data components of a score set.

Next, the score set creation process (step S10) in FIG. 11 will be specifically described with reference to FIGS. 21 and 22. FIG. 21 is a flowchart of the score set creation process in FIG. 11. FIG. 22 shows an example of data components of a score set.

As described above, the score set creation process is a process for creating a score set. The score set is data that stores a score for each tag ID. The score is a value showing a probability that one of POS data of the POS range data of a tag ID is POS data that should be associated with the tag ID. The score set creation process is executed on the purchase data set that is created in the conversion process in FIG. 20. As the score is higher, the probability of associating the tag ID with the POS data that are bases of score calculation is determined to be higher (that is, a degree of association of the flow line data of the tag ID with the POS data is determined to be higher).

A score SC is a value obtained by adding a match rate $S_M$ and an adjustment value $S_A$ together, which will be described below (that is, $SC=S_M+S_A$).

The major factor that affects the score SC is the match rate $S_M$.

The match rate $S_M$ is a resultant value (value in the range of 0 to 1) of calculation "$N_B \div N_A$", in which $N_A$ is a number of valid categories and $N_B$ is a number of matched categories. Herein, the number $N_A$ of valid categories is a number of the product categories contained in processing target POS data. The number $N_B$ of matched categories is a number of the product categories agreeing with the product categories contained in the processing target POS data, among the product categories assigned to the zones through which the radio tag of processing target tag ID passed. The flow line data of the processing target tag ID is referred to, in order to determine the number $N_B$ of matched categories.

In one example in which processing target POS data contains four product categories (e.g., "alcoholic beverages", "confectionery", "flower", and "dairy products"), the number $N_A$ of valid categories is 4. In this state, the flow line data of the radio tag of the processing target tag ID is referred to, and it may be determined that "alcoholic beverages" and "flower" are product categories that agree with the product categories contained in the processing target POS data, among the product categories assigned to the zones through which the radio tag of the tag ID passed. In this case, the number $N_B$ of matched categories is 2. As a result, the match rate $S_M$ is 0.5 (=2÷4).

On the basis of the following data contained in the pre-scoring processed data of the processing target, the adjustment value $S_A$ is calculated.

Repeat value per zone (number of repetitions of entering and leaving)

Total stay time per zone in the store

Entering data to the perfectly match zone (value showing whether a purchaser entered)

Entering data to a zone other than the perfectly match zone (value showing whether a purchaser entered)

As described above, a high repeat value of a certain zone can be considered to represent a high possibility that a purchaser purchased a product in the certain zone. In consideration of this, it is preferable to set the adjustment value $S_A$ to be higher as the repeat value of a zone of the product category contained in the processing target POS data is higher.

In one example in which the repeat values of a plurality of zones are 0 (times), 1 to 3 (times), and 6 or more (times), respectively, the adjustment values based on the repeat value may be 0, 0.1, and 0.2 (maximum), respectively. The sum of the adjustment values that are determined for the respective zones is used as an adjustment value $S_{AR}$ based on the repeat value. An upper limit (e.g., 0.5) may be set to the adjustment value $S_{AR}$ based on the repeat value.

As described above, a long total stay time in a certain zone can be considered to represent a high possibility that a purchaser stopped in the certain zone to select a product and purchased it. In consideration of this, it is preferable to set the adjustment value $S_A$ to be higher as the total stay time in a zone of the product category contained in the processing target POS data is longer.

In one example in which the total stay times in a plurality of zones are less than 5 seconds, not less than 5 seconds and less than 20 seconds, and not less than 20 seconds, respectively, the adjustment values based on the total stay time may be 0, 0.1, and 0.2 (maximum), respectively. The sum of the total stay times that are determined for the respective zones is used as an adjustment value $S_{AT}$ based on the total stay time. An upper limit (e.g., 0.5) may be set to the adjustment value $S_{AT}$ based on the total stay time.

Assuming that an adjustment value based on the entering data to the perfectly match zone is $S_{AE}$, the adjustment value $S_{AE}$ may be set to a relatively large negative value (e.g., −5) as to the radio tag of the processing target tag ID having not entered all of the perfectly match zones. As described above, the perfectly match zone is, for example, a zone in which the positions of products are not changed among the sell zones of products belonging to the product categories contained in the processing target POS data. Thus, it is impossible to purchase the products without passing through the perfectly match zone. In other words, the perfectly match zone based on the POS data is a zone through which the radio tag of the tag ID to be associated must pass. From this point of view, the score of a tag ID of a radio tag that did not enter the perfectly match zone may be adjusted so as to be greatly decreased.

In summary, the score SC is calculated by the following (Formula 1) or (Formula 2), for example.

$$SC=S_M+S_{AR}\pm S_{AT} \quad \text{(Formula 1)}$$

$$SC=S_M+S_{AR}\pm S_{AT}\pm S_{AE} \quad \text{(Formula 2)}$$

Herein, $S_M$: Match rate, $S_{AR}$: Adjustment value based on repeat value, $S_{AT}$: Adjustment value based on total stay time, and $S_{AE}$: Adjustment value based on entering data to perfectly match zone.

With reference to FIG. 21, the server 5 performs the processes in steps S70 to S78 of the flowchart in FIG. 21, on all tag IDs of the purchase data set (refer to FIG. 19), which is obtained in the conversion process, with respect to all of the POS data P-i (i=1 to N) (steps S80 and S82).

The server 5 first calculates a match rate $S_M$ from the product category contained in processing target POS data P-i and from the flow line data of processing target tag ID (step S70). The server 5 then determines an adjustment value $S_A$ from the pre-scoring processed data corresponding to the processing target tag ID (for example, the sum of the adjustment values $S_{AR}$, $S_{AT}$, and $S_{AE}$) (step S72). Assuming that the score of the k-th tag ID is represented as "SC(i, k)" in the purchase data set of the processing target POS data P-i, the server 5 calculates the score SC(i, k) from the sum of $S_M$ and $S_A$ (step S74).

In the case in which the score SC(i, k), which is calculated in step S74, is a predetermined threshold TH or higher (step S76: YES), the server 5 stores this score in the score set (step S78). In the case in which the score SC(i, k) is less than the predetermined threshold TH, this score is considered to have a low reliability and is thus not stored in the score set.

As shown in FIG. 22, the score set contains the processing target POS data and scores, which are calculated for the processing target tag ID, in the form of the pre-conversion data (refer to FIG. 19); in other words, the score set contains scores that are organized by each POS data contained in the POS range data, with respect to each tag ID.

The score is calculated for all of the combinations of each POS data and a tag ID in the purchase data set (refer to FIG. 19), resulting in calculation of the score for each POS data contained in the POS range data with respect to each tag ID. Thus, repeating the processes in steps S70 to S78 in FIG. 21 produces the score set as shown in FIG. 22. In other words, the score set can be understood as data storing the score SC(i, k), which is calculated by the processes in steps S70 to S74 in FIG. 21, instead of the pre-scoring processed data, in the pre-conversion data in FIG. 19.

(5-7) Matched Data Set Creation Process

Next, the matched data set creation process (step S12) in FIG. 11 will be specifically described with reference to FIG. 23. FIG. 23 shows an example of data components of a matched data set.

As described above, the matched data set creation process is a process for creating a matched data set by referring to the score set. The matched data set contains each tag ID that is associated with one of POS data of the POS database.

As shown in FIG. 22, the score set stores scores per tag ID in a manner associated with respective POS data, which are contained in the POS range data created based on the checkout counter entering time of the radio tag. The POS data having the highest score among the POS range data of a tag ID is POS data that has the highest probability of being associated to the tag ID.

In one example, in order to create a matched data set by using the score set data in FIG. 22, POS data having the highest score is selected from POS data P (1, 1), P (1, 2), . . . , and P (1, $M_1$) contained in POS range data PR (1), for a tag ID 1. Similarly, POS data having the highest score is selected from POS range data of each of tag IDs 2 to N.

On the basis of the purchase data set (refer to FIG. 13) and the matched data set, the flow line data of a purchaser and one of POS data of the POS database are associated with each other.

The above-described conversion process creates a purchase data set by sorting POS data in the order of the checkout counter entering time, in accordance with step S62 in FIG. 20. Then, the score set creation process calculates a score by successively processing data of the created purchase data set (that is, in the order from a tag ID having an earlier checkout counter entering time). Under these conditions, the scores may be confirmed as follows: a purchase data set is created by sorting POS data in the order from a later checkout counter entering time in the conversion process, and a score is calculated by successively processing data of the created purchase data set (that is, in the order from a tag ID having a later checkout counter entering time) in the score set creation process.

As described above, in the purchase analysis system 1 of this embodiment, the server 5 acquires flow line data of each of a plurality of tag IDs for identifying the radio tags 2 that move together with respective purchasers in a store (flow line data of purchasers) and a POS database as sales information of the store. The server 5 acquires a score as the degree of association of the flow line data of the purchaser with the POS data, based on the flow line data of the purchaser and position information of sell zones, which are set for respective product categories, in the store area. In one example, the server 5 calculates the score of each POS data of a processing target ID, which is one of the plurality of the tag IDs, from the number of the product categories contained in each POS data of the POS database and from the number of the product categories agreeing with the product categories contained in each POS data among the product categories that are identified for the processing target ID. The server 5 then associates (matches) the processing target ID with one of POS data of the POS database, based on the calculated score. Thus, the server 5 associates the flow line data of the purchaser with one of POS data of the POS database. As a result, the behavior in the store of the purchaser is associated with an actual purchase result of the purchaser.

Although the POS range data is created in the above-described embodiment, this data is not essential. The tag ID can be associated with the POS data without creating the POS range data. Nevertheless, creating the POS range data narrows down candidates for POS data having a high possibility of being associated with the tag ID, in a possible range based on the checkout counter entering time, and thus, it enables obtaining a correct matching result at high speed.

The foregoing embodiment describes a case of having a plurality of checkout counters in a store, but the number of the checkout counters is not limited. In the case of having a plurality of checkout counters, the checkout counter number of the checkout counter that the radio tag enters is identified for each tag ID, and candidates for POS data having a high probability of being associated with the tag ID can be narrowed down in a more possible range by the identified checkout counter number.

Although an example of adjusting the score by using the repeat value of each zone and the total stay time in each zone is shown in the foregoing embodiment, these values may not be used. The score may be determined only by the match rate, and then the tag ID may be associated with the POS data. Nevertheless, adjusting the score by using the repeat value and/or the total stay time in each zone enables selecting POS data having a higher probability, for example, from two or more pieces of POS data having the same match rate of the processing target tag ID.

Although the match rate $S_M$ is calculated as a factor of the score in the above-described embodiment, the factor is not limited thereto. In one example, instead of the match rate $S_M$, a difference $(N_A-N_B)$ between the number $N_A$ of valid categories and the number $N_B$ of matched categories may be calculated and be reflected in the score. Alternatively, the number $N_B$ of matched categories itself may be reflected in the score.

Although the foregoing embodiment describes a case of calculating a score by using the match rate $S_M$, the adjustment value $S_{AR}$ based on the repeat value, the adjustment value $S_{AT}$ based on the total stay time, and the adjustment value $S_{AE}$ based on the entering data of the perfectly match zone, the number of the factors is not limited. The score may not be calculated by using all of these values and may be calculated by using only one or some of these values.

In the above-described embodiment, in consideration of the possibility of changing the sell zone of products belonging to a product category, the perfectly match flag ("True" or "False") is set in associating the product category and the sell zone with each other (refer to FIG. 3). However, the above-described embodiment is not limited to this case. The perfectly match flag is not necessarily set in the case in which products belonging to a product category are fixedly associated with the sell zone or in the case in which a product placement table is updated immediately in response to change in product placement in the store.

Although the store terminal 4 and the server 5 exchange data with each other via the network NW in the above-described embodiment, the method of exchanging data is not limited thereto. Data can be exchanged between the store terminal 4 and the server 5 by a storage medium, such as a universal serial bus (USB) memory, a secure digital (SD) memory card, an HDD, or a solid state drive (SSD). The same applies to data exchange between the POS system 7 and the server 5.

Although an embodiment of the information processing apparatus and the program is described above, the present invention should not be limited to the foregoing embodiment. In addition, the embodiment described above can be variously modified and altered within the scope not departing from the gist of the present invention.

The invention claimed is:

1. An information processing apparatus configured to associate flow line information of a purchaser and product sales information,
   a region in an area where products are placed being set per category of products,
   the information processing apparatus comprising a processor configured to:
   acquire the flow line information of the purchaser from a communication device that moves together with the corresponding purchaser in the area, the flow line information of the purchaser containing position information showing positions in the area of the communication device with the lapse of time;
   acquire the product sales information that contains sales times of products and categories of the products purchased at the sales times;
   identify the categories of the products that are associated with the flow line information of the purchaser, from the flow line information of the purchaser and from the category information of the products placed in the area;
   acquire a degree of association of the flow line information of the purchaser with the product sales information, based on the categories of the products contained in the product sales information and based on the identified categories; and
   associate the flow line information of the purchaser with the product sales information based on the degree of association;
   wherein the processor is further configured to:
      calculate a number of repetitions of entering and leaving each of the regions in the area set per category of the products, from the flow line information of the purchaser, and
      adjust the degree of association by using the number of repetitions.

2. The information processing apparatus according to claim 1, wherein the processor is configured to acquire the product sales information containing the sales times during a predetermined range including an entering time to a product payment region in the area, the entering time being determined from the flow line information of the purchaser.

3. The information processing apparatus according to claim 2, wherein the processor is further configured to:
   measure time during which each of virtual points continuously exists in a predetermined region, the predetermined region being set so as to center at each of positions shown by the position information contained in the flow line information of the purchaser, each of the virtual points being defined at a point of intersection between virtual lines that are arranged in a grid in the area; and
   aggregate the measured times of the respective virtual points, with respect to each of the regions in the area set per category of the products,
   wherein the processor is configured to adjust the degree of association by using the measurement times that are aggregated with respect to each of the categories of the products contained in the product sales information.

4. The information processing apparatus according to claim 2, wherein the processor is configured to adjust the degree of association to be low, in a case in which the regions in the area where the purchaser has passed, which are identified from the flow line information of the purchaser, do not include the region in the area set for the category of the products contained in the product sales information.

5. The information processing apparatus according to claim 2, wherein the processor is configured to acquire the product sales information containing payment machine information in the product payment region in the area, the payment machine information being determined from the flow line information of the purchaser.

6. The information processing apparatus according to claim 5, wherein the processor is further configured to:
   measure time during which each of virtual points continuously exists in a predetermined region, the predetermined region being set so as to center at each of positions shown by the position information contained in the flow line information of the purchaser, each of the virtual points being defined at a point of intersection between virtual lines that are arranged in a grid in the area; and
   aggregate the measured times of the respective virtual points, with respect to each of the regions in the area set per category of the products,
   wherein the processor is configured to adjust the degree of association by using the measurement times that are aggregated with respect to each of the categories of the products contained in the product sales information.

7. The information processing apparatus according to claim 5, wherein the processor is configured to adjust the degree of association to be low, in a case in which the regions in the area where the purchaser has passed, which are identified from the flow line information of the purchaser, do not include the region in the area set for the category of the products contained in the product sales information.

8. The information processing apparatus according to claim 1, wherein the processor is further configured to:
   measure time during which each of virtual points continuously exists in a predetermined region, the predetermined region being set so as to center at each of positions shown by the position information contained in the flow line information of the purchaser, each of the virtual points being defined at a point of intersection between virtual lines that are arranged in a grid in the area; and
   aggregate the measured times of the respective virtual points, with respect to each of the regions in the area set per category of the products,
   wherein the processor is configured to adjust the degree of association by using the measurement times that are aggregated with respect to each of the categories of the products contained in the product sales information.

9. The information processing apparatus according to claim 8, wherein the processor is configured to adjust the degree of association to be low, in a case in which the regions in the area where the purchaser has passed, which are identified from the flow line information of the purchaser, do not include the region in the area set for the category of the products contained in the product sales information.

10. The information processing apparatus according to claim 1, wherein the processor is configured to adjust the degree of association to be low, in a case in which the regions in the area where the purchaser has passed, which are identified from the flow line information of the purchaser, do not include the region in the area set for the category of the products contained in the product sales information.

11. The information processing apparatus according to claim 10,
wherein one of a first setting or a second setting is specified for each category of the products, the first setting being applied for product(s) in which there is no possibility of changing the region in the area where the product(s) are placed, the second setting being applied for product(s) in which there is a possibility of changing the region in the area where the product(s) are placed, and
wherein the processor is configured to adjust the degree of association to be low, in a case in which the regions in the area where the purchaser has passed, which are identified from the flow line information of the purchaser, do not include the region in the area set to the category of the products for which the first setting is applied, among the categories of the products contained in the product sales information.

12. The information processing apparatus according to claim 1,
wherein the processor is configured to acquire the degree of association by dividing "B" by "A", "A" being defined as a number of categories of the products contained in the product sales information, "B" being defined as a number of categories matching the categories of the products contained in the product sales information, among the identified categories of the products, and
wherein the processor is configured to associate the product sales information of the highest degree of association, with the flow line information of the purchasers.

13. The information processing apparatus according to claim 1, wherein the processor is configured to adjust the degree of association to be low, in a case in which the regions in the area where the purchaser has passed, which are identified from the flow line information of the purchaser, do not include the region in the area set for the category of the products contained in the product sales information.

14. An information processing method for associating flow line information of a purchaser and product sales information, the method comprising:
a step (a) of acquiring, by one or more processors, the flow line information of the purchaser from a communication device that moves together with the corresponding purchaser in the area, the flow line information of the purchaser containing position information showing positions in the area of the communication device with the lapse of time;
a step (b) of acquiring, by the one or more processors, the product sales information that contains sales times of products and categories of the products purchased at the sales times;
a step (c) of identifying, by the one or more processors, the categories of the products that are associated with the flow line information of the purchaser, from the flow line information of the purchaser acquired by the step (a) and from the category information of the products placed in the area;
a step (d) of acquiring, by the one or more processors, a degree of association of the flow line information of the purchaser with the product sales information, based on the categories of the products contained in the product sales information acquired by the step (b) and based on the categories of the products identified by the step (c); and
a step (e) of associating, by the one or more processors, the flow line information of the purchaser with the product sales information based on the degree of association acquired by the step (d);
the method further comprising:
calculating, by the one or more processors, e a number of repetitions of entering and leaving each of the regions in the area set per category of the products, from the flow line information of the purchaser, and
adjusting, by the one or more processors, the degree of association by using the number of repetitions.

15. A computer-readable recording medium recording a program, the program configured to cause a computer to execute a method of associating flow line information of a purchaser and product sales information,
the method comprising:
a process of acquiring the flow line information of the purchaser from a communication device that moves together with the corresponding purchaser in the area, the flow line information of the purchaser containing position information showing positions in the area of the communication device with the lapse of time;
a process of acquiring the product sales information that contains sales times of products and categories of the products purchased at the sales times;
a process of identifying the categories of the products that are associated with the flow line information of the purchaser, from the flow line information of the purchaser acquired by the process of acquiring the flow line information and from the category information of the products placed in the area;
a process of acquiring a degree of association of the flow line information of the purchaser with the product sales information, based on the categories of the products contained in the product sales information acquired by the process of acquiring the product sales information and based on the categories of the products identified by the process of identifying the categories of the products; and
a process of associating the flow line information of the purchaser with the product sales information based on the degree of association acquired by the process of acquiring the degree of association; and
the method further comprising:
calculating a number of repetitions of entering and leaving each of the regions in the area set per category of the products, from the flow line information of the purchaser, and
adjusting the degree of association by using the number of repetitions.

* * * * *